(12) United States Patent
Wade

(10) Patent No.: US 6,404,945 B1
(45) Date of Patent: Jun. 11, 2002

(54) WAVELENGTH DIVISION MULTIPLEXING/DEMULTIPLEXING DEVICES USING HOMOGENEOUS REFRACTIVE INDEX LENSES

(75) Inventor: Robert K. Wade, Stratham, NH (US)

(73) Assignee: LightChip, Inc., Salem, NH (US)

( * ) Notice: Subject to any disclaimer, the term of this patent is extended or adjusted under 35 U.S.C. 154(b) by 0 days.

(21) Appl. No.: 09/382,492

(22) Filed: Aug. 25, 1999

Related U.S. Application Data

(63) Continuation-in-part of application No. 08/990,197, filed on Dec. 13, 1997, now Pat. No. 6,011,884, and a continuation-in-part of application No. 08/990,199, filed on Dec. 13, 1997, now Pat. No. 5,999,672.

(51) Int. Cl.$^7$ ............................................. G02B 6/293
(52) U.S. Cl. ............................ 385/24; 385/33; 385/34; 385/37
(58) Field of Search ............................... 385/24, 33, 34, 385/37

(56) References Cited

U.S. PATENT DOCUMENTS

| | | | |
|---|---|---|---|
| 4,111,524 A | 9/1978 | Tomlinson, III | 350/96.19 |
| 4,153,330 A | 5/1979 | Tomlinson, III | 350/96.17 |
| 4,198,117 A | 4/1980 | Kobayashi | 350/96.19 |
| 4,274,706 A | 6/1981 | Tangonan | 350/96.19 |
| 4,279,464 A | 7/1981 | Colombini | 350/96.19 |
| 4,299,488 A | 11/1981 | Tomlinson, III | 356/328 |
| 4,343,532 A | 8/1982 | Palmer | 350/96.19 |
| 4,387,955 A | 6/1983 | Ludman et al. | 350/96.19 |
| 4,479,697 A | 10/1984 | Kapany et al. | 350/96.18 |
| 4,522,462 A | 6/1985 | Large et al. | 350/96.19 |
| 4,583,820 A | 4/1986 | Flamand et al. | 350/96.19 |
| 4,622,662 A | 11/1986 | Laude et al. | 370/3 |
| 4,626,069 A | 12/1986 | Dammann et al. | 350/162.2 |
| 4,634,215 A | 1/1987 | Reule | 350/96.16 |
| 4,643,519 A | 2/1987 | Bussard et al. | 350/96.19 |
| 4,652,080 A | 3/1987 | Carter et al. | 350/96.19 |

(List continued on next page.)

FOREIGN PATENT DOCUMENTS

| | | |
|---|---|---|
| EP | 0 859 249 A1 | 8/1998 |
| WO | WO 99/31532 | 6/1999 |

OTHER PUBLICATIONS

G. R. Harrison, Ph.D., Sc.D. et al., Practical Spectroscopy, Chapter 4—Diffraction–Grating Spectrographs, Prentice–Hall (1948).

W. J. Tomlinson, Wavelength multiplexing in multimode optical fibers, Applied Optics, vol. 16, No. 8 (Aug. 1977).

W. J. Tomlinson et al., Optical multiplexer for multimode fiber transmission systems, Appl. Phys. Lett., vol. 31, No. 3 (Aug. 1977).

(List continued on next page.)

*Primary Examiner*—John D. Lee
*Assistant Examiner*—Jennifer Doan
(74) *Attorney, Agent, or Firm*—Hunton & Williams

(57) ABSTRACT

An improved wavelength division multiplexing device is disclosed. The improved wavelength division multiplexing device has a diffraction grating for combining a plurality of monochromatic optical beams into a multiplexed, polychromatic optical beam. The improvement in the improved wavelength division multiplexing device is the use of a homogeneous refractive index collimating/focusing lens for collimating the plurality of monochromatic optical beams traveling along a first direction to the diffraction grating, and for focusing the multiplexed, polychromatic optical beam traveling along a second direction from the diffraction grating, wherein the second direction being substantially opposite the first direction.

38 Claims, 11 Drawing Sheets

U.S. PATENT DOCUMENTS

| | | | |
|---|---|---|---|
| 4,671,607 A | 6/1987 | Laude | 350/96.15 |
| 4,703,472 A | 10/1987 | Blumentritt et al. | 370/3 |
| 4,708,425 A | 11/1987 | Gouali et al. | 350/96.16 |
| 4,726,645 A | 2/1988 | Yamashita et al. | 350/96.18 |
| 4,740,951 A | 4/1988 | Lizet et al. | 370/3 |
| 4,741,588 A | 5/1988 | Nicia et al. | 350/96.19 |
| 4,744,618 A | 5/1988 | Mahlein | 350/96.19 |
| 4,746,186 A | 5/1988 | Nicia | 350/96.13 |
| 4,748,614 A | 5/1988 | Dammann et al. | 370/3 |
| 4,749,247 A | 6/1988 | Large | 350/96.16 |
| 4,752,108 A | 6/1988 | Vollmer | 350/96.12 |
| 4,760,569 A | 7/1988 | Mahlein | 350/3 |
| 4,763,969 A | 8/1988 | Khoe et al. | 350/96.19 |
| 4,773,063 A | 9/1988 | Hunsperger et al. | 370/3 |
| 4,786,133 A | 11/1988 | Gidon et al. | 350/96.19 |
| 4,819,224 A | 4/1989 | Laude | 370/3 |
| 4,834,485 A | 5/1989 | Lee | 350/96.19 |
| 4,836,634 A | 6/1989 | Laude | 350/96.19 |
| 4,857,726 A | 8/1989 | Kinney et al. | 250/226 |
| 4,923,271 A | 5/1990 | Henry et al. | 350/96.19 |
| 4,926,412 A | 5/1990 | Jannson et al. | 370/3 |
| 4,930,855 A | 6/1990 | Clark et al. | 350/96.19 |
| 4,934,784 A | 6/1990 | Kapany et al. | 350/96.18 |
| 5,026,131 A | 6/1991 | Jannson et al. | 350/3.7 |
| 5,107,359 A | 4/1992 | Ohuchida | 359/124 |
| 5,170,451 A | 12/1992 | Ohshima | 385/43 |
| 5,210,374 A | 5/1993 | Channell | |
| 5,228,103 A | 7/1993 | Chen et al. | 385/14 |
| 5,278,687 A | 1/1994 | Jannson et al. | 359/125 |
| 5,355,237 A | 10/1994 | Lang et al. | 359/130 |
| 5,363,220 A | 11/1994 | Kuwayama et al. | 359/3 |
| 5,440,416 A | 8/1995 | Cohen et al. | 359/127 |
| 5,442,472 A | 8/1995 | Skrobko | 359/110 |
| 5,450,510 A | 9/1995 | Boord et al. | 385/37 |
| 5,457,573 A | 10/1995 | Iida et al. | 359/569 |
| 5,500,910 A | 3/1996 | Boudreau et al. | 385/24 |
| 5,513,289 A | 4/1996 | Hosokawa et al. | 385/33 |
| 5,526,155 A | 6/1996 | Knox et al. | 359/130 |
| 5,541,774 A | 7/1996 | Blankenbecler | 359/653 |
| 5,555,334 A | 9/1996 | Ohnishi et al. | 385/93 |
| 5,583,683 A | 12/1996 | Scobey | 359/127 |
| 5,606,434 A | 2/1997 | Feldman et al. | 359/3 |
| 5,657,406 A | 8/1997 | Ball | 385/24 |
| 5,703,722 A | 12/1997 | Blankenbecler | 359/653 |
| 5,742,416 A | 4/1998 | Mizrahi | 359/134 |
| 5,745,270 A | 4/1998 | Koch | 359/124 |
| 5,745,271 A | 4/1998 | Ford et al. | 359/130 |
| 5,745,612 A | 4/1998 | Wang et al. | 385/24 |
| 5,748,350 A | 5/1998 | Pan et al. | 359/130 |
| 5,748,815 A | 5/1998 | Hamel et al. | 385/37 |
| 5,768,450 A | 6/1998 | Bhagavatula | 385/24 |
| 5,777,763 A | 7/1998 | Tomlinson, III | 359/130 |
| 5,999,672 A | * 12/1999 | Hunter et al. | 385/37 |
| 6,011,884 A | * 1/2000 | Dueck et al. | 385/24 |
| 6,011,885 A | * 1/2000 | Dempewolf et al. | 385/34 |
| 6,108,471 A | * 8/2000 | Zhang et al. | 385/37 |
| 6,134,359 A | * 10/2000 | Keyworth et al. | 385/33 |

OTHER PUBLICATIONS

W. J. Tomlinson et al., Optical wavelength–division multiplexer for the 1–1.4 βm spectral region, Electronics Letters, vol. 14, No. 11 (May 25, 1973).

T. Miki et al., Viabilities of the wavelength–division–multiplexing transmission system over an optical fiber cable, IEEE Transactions on Communications, vol. Com–26, No. 7 (Jul. 1978).

K. Aoyama et al., Optical demultiplexer for a wavelength division multiplexing system, Applied Optics, vol. 18, No. 8 (Apr. 15, 1979).

K. Aoyama et al., Low–loss optical demultiplexer for WDM systems in the 0.8–$\mu$m wavelength region, Applied Optics, vol. 18, No. 16 (Aug. 15, 1979).

R. Watanabe et al., Optical Demultiplexer Using Concave Grating in 0.7–0.9 um Wavelength Region, Electronics Letters, vol. 16, No. 3 (Jan. 31, 1980).

K. Kobayashi et al., Microoptic Grating Multiplexers and Optical Isolators for Fiber–Optic Communicatons, Journal of Quantum Electronics, vol. QE–16, No. 1 (Jan. 1980).

Yohji Fujii et al., Optical Demultiplexer Using a Silison Echelette Grating, IEEE Journal of Quantum Electronics, vol. QE–16, No. 2 (Feb. 1980).

W. J. Tomlinson, Applications of GRIN–rod lenses in optical fiber communication systems, Applied Optics, vol. 19, No. 7 (Apr. 7, 1980).

A. Nicia, Wavelength Multiplexing and Demultiplexing Systems for Singlemode and Multimode Fibers, Conference Proceedings, European Conference on Optical Communication (Sep. 8–11, 1981).

B. D. Metcalf et al., High–capacity wavelenth demultiplexer with a large–diameter GRIN rod lens, Applied Optics, vol. 21, No. 5 (Mar. 1, 1982).

J. Lipson et al., Low–Loss Wavelenght Division Multiplexing (WDM) Devices for Single–Mode Systems, Journal of Lightwave Technology, vol. LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

H. Ishio et al., Review and Status of Wavelength–Division–Multiplexing Technology and Its Application, Journal of Lightwave Technology, vol. LT–2, No. 4 (Aug. 1984).

Y. Fujii et al., Optical Demultiplexer Utilizing and Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. LT–3, No. 3 (Jun. 1985).

J. Lipson et al., A Six–Channel Wavelength Multiplexing and Demultiplexer for Single Mode Systems, Journal of Lightwave Technology, vol. LT–3, No. 5 (Oct. 1985).

I. Nishi et al., Broad Passband Multi/Demultiplexer for Multimode Fibers Using a Diffraction Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optics Letters, vol. 14, No. 19 (Oct. 1, 1989).

Y. Huang et al., Wavelength–division–multiplexing and –demultiplexing by using a substrate–mode grating pair, Optics Letters, vol. 17, No. 22 (Nov. 15, 1992).

M. Wu et al., Design Considerations for Rowland Circle Grating Used in Photonic Integrated Devices for WDM Applications, Journal of Lightwave Technology, vol. 12, No. 11 (Nov. 1994).

A. Stavdas et al., Design of a holographic concave grating used as a multiplexer/demultiplexer in dense wavelength–routed optical networks with subnanometer channel spacing, Journal of Modern Optics, vol. 42, No. 9, pp. 1863–1874 (Sep. 1995).

C. Zhou et al., Four Channel Multimode Wavelength Division Demultiplexer (WDM) System Based on Surface–normal Volume Holographic Gratings and Substrate–guided Waves, SPIE, vol. 3288.

A. Stavdas et al., Free–Space Aberration–Corrected Diffraction Grating Demultiplxer for Application in Densely–Spaced, Subnanometer Wavelength Routed Optical Networks, IEEE Electronic Letters, vol. 31, No. 16, pp. 1368–1370 (Aug. 1995).

D. Wiseley, High performance 32 channel HDWDM multiplexer with 1nm channel spacing and 0.7nm bandwidth, SPIE, vol. 1578, Fiber Networks for Telephony and CATV (1991).

A. Cohen et al., Active management of 100–GHz–spaced WDM channels, Optical Fiber Communication Conference and the International Conference on Integrated Optics and Optical Fiber Communication, Technical Digest, Conference Edition (Feb. 24, 1999).

B. Keyworth et al., Low Loss, Temperature Stable Diffraction Grating Wavelength (DE) Multiplexer, National Fiber Optic Engineers Conference, Technical Proceedings, vol. I (Sep. 13–17, 1998).

M. Seki et al., 20—Channel Micro–Optic Grating Demultiplexer for 1.1–1.6um Band Using a Small Focusing Parameter Graded–Index Rod Lens, Electronics Letters, vol. 18, No. 6 (Mar. 18, 1982).

A. Koonen, A Compact Wavelength Demultiplexer Using Both Interference Filters and a Diffraction Grating, European Conference of Optical Communication, Conference Proceedings (Sep. 8–11, 1981).

J. Conradi et al., Laser Based WDM Multichannel Video Transmission System, Electronic Letters, vol. 17, No. 2, (Jan. 22, 1981).

J. Laude et al., Wavelength divison multiplexing/demultiplexing (WDM) using diffraction grating, SPIE, vol. 503, Application, Theory, and Fabricationof Periodic Structures (1984).

A. Livanos et al., Chirped–grating demultiplexers in dielectric waveguides, Applied Physics Letters, vol. 30, No. 10 (May 1977).

H. Obara et al., Star Coupler Based WDM Switch Employing Tunable Devices With Reduced Tunability Range, Electronic Letters, vol. 28, No. 13 (Jun. 1992).

A. Willner et al., 2–D WDM Optical Interconnections Using Multiple–Wavelength VCSEL's for Simultaneous and Reconfigurable Communication Among Many Planes, IEEE Phoyonics Technology Letters, vol. 5, No. 7 (Jul. 1993).

M. Wang et al., Five Channel Polymer Waveguide Wavelength Division Demultiplexer for the Near Infrared, IEEE Photonics Technology Letters, vol. 3, No. 1 (Jan. 1991).

M. Li et al., Two–channel surface–normal wavelength demultiplexer using substrate guided waves in conjuction with multiplexed waveguided holograms, Appl. Phys. Lett., vol. 66, No. 3 (Jan. 1995).

J. Laude et al., Stimax, A Grating Multiplexer for Monomode or Multimode Fibers, Ninth European Conference on Optical Communication–ECOC83, Geneva, Switzerland (Oct. 23–26, 1983).

R. Watanabe et al., Optical Grating Multiplexer in the 1.1–1.5mm Wavelength Region, Electronics Letters, vol. 16, No. 3 (Jan. 31, 1980).

G.D. Khoe, New Integrated Subscriber Star Network Combining Maximum Versatility With Minimum Cost of Installation and Maintenance, European Conference on Optical Communication, Conference Proceedings, Copenhagen, Bella Center (Sep. 8–11, 1981).

T. Lingelsheim et al., Fabrication of micro–optical wavelength division multiplexer (WDM) gratings on glass using an ion etching technique, SPIE vol. 503, Application, Theory, and Fabrication of Periodic Structures (1984).

D. Maystre et al., Optimization of wavelength demultiplexer in fiber optics using gold echelette gratings, SPIE vol. 503, Application, Theory, and Fabrication of Periodic Structures (1984).

D. Wisely, 32 Channel WDM Multiplexer with 1nm Channel Spacing and 0.7nm Bandwidth, Electronics Letters, vol. 27, No. 6 (Mar. 14, 1991).

* cited by examiner

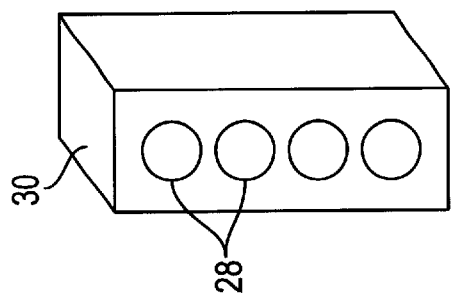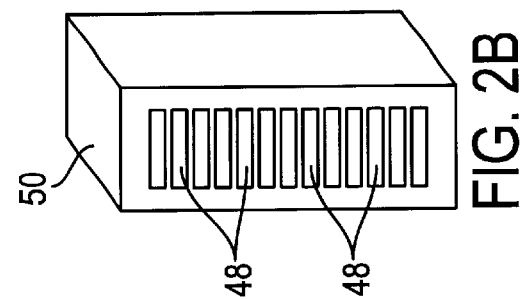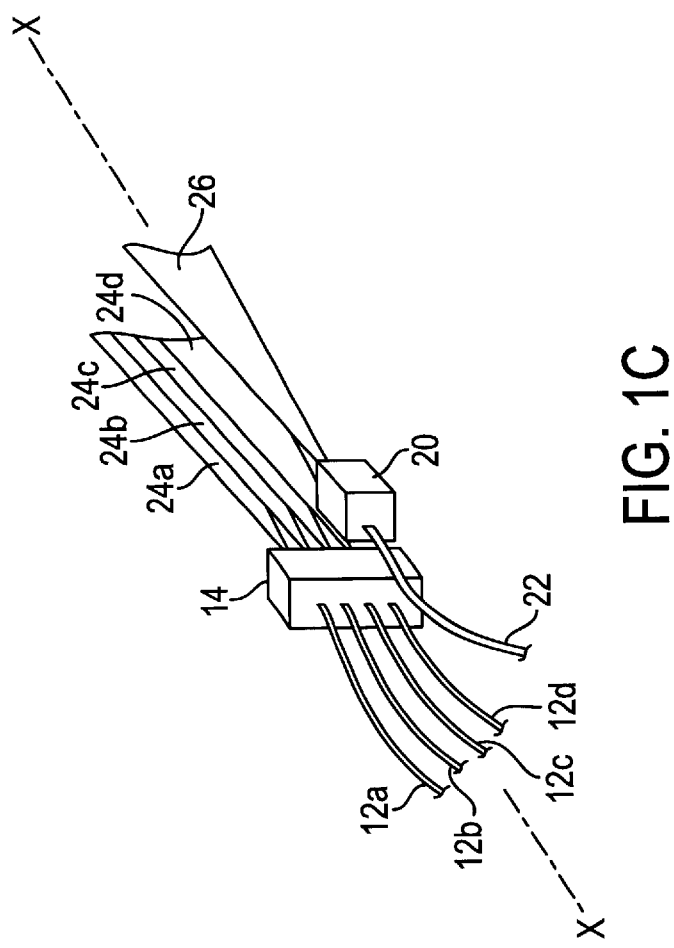

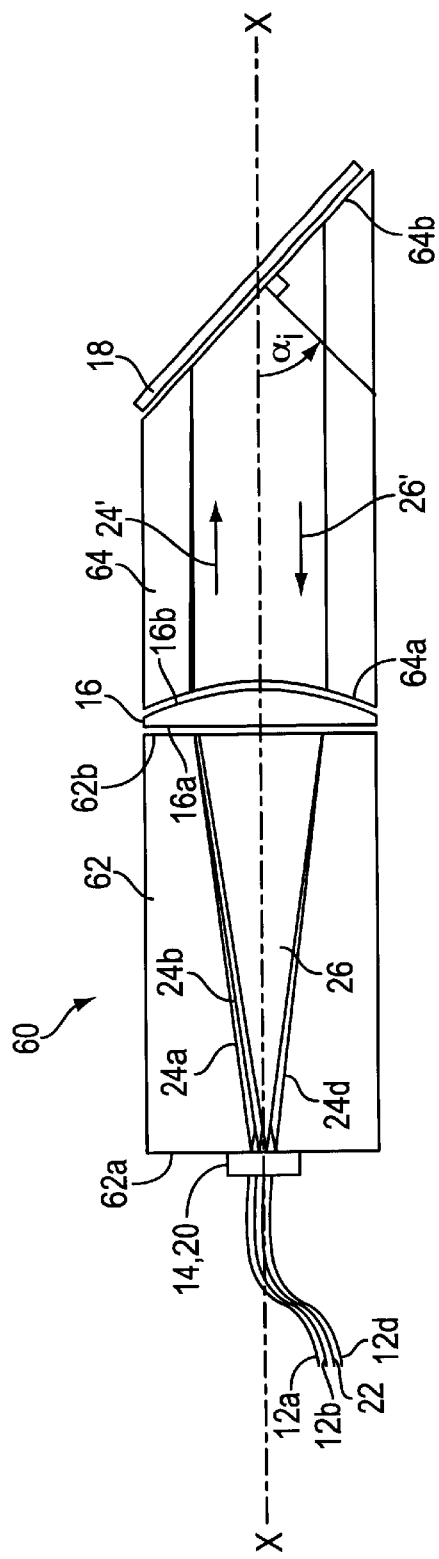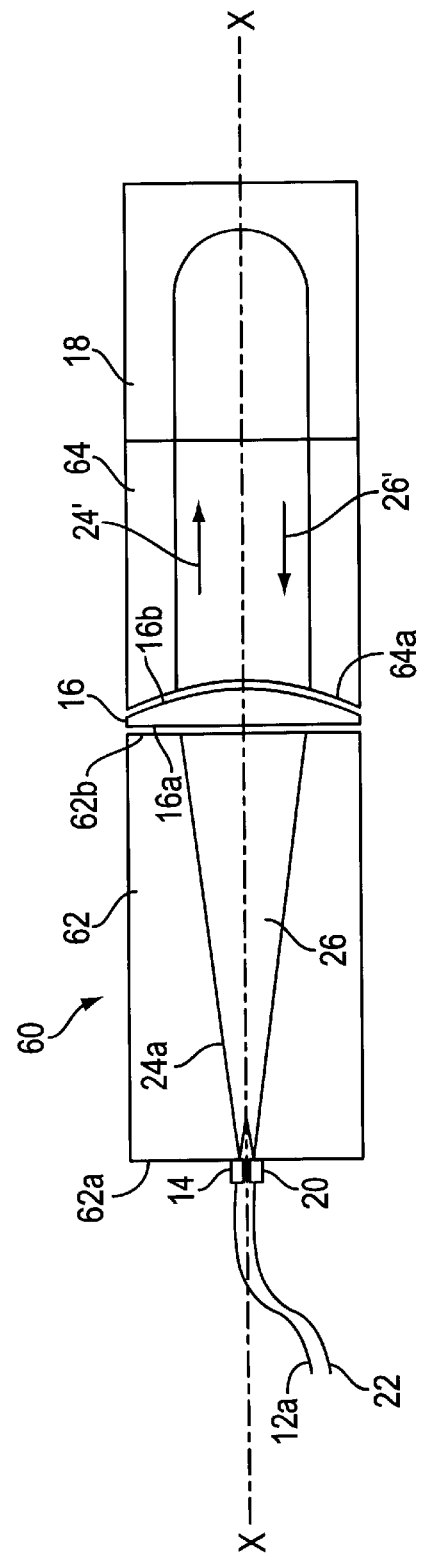
FIG. 4A
FIG. 4B

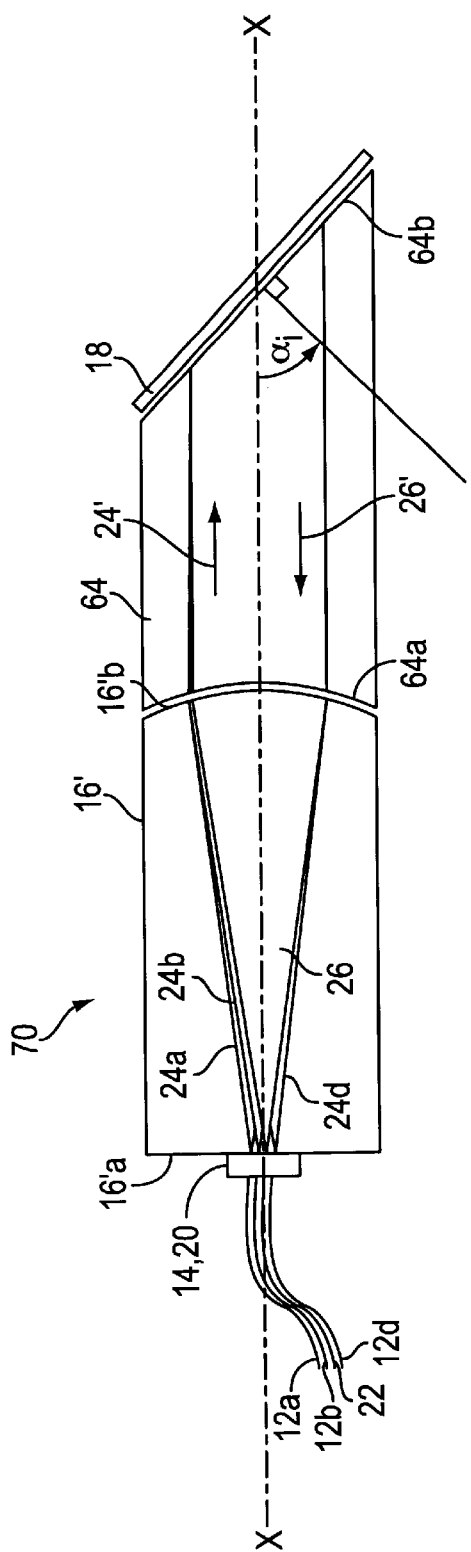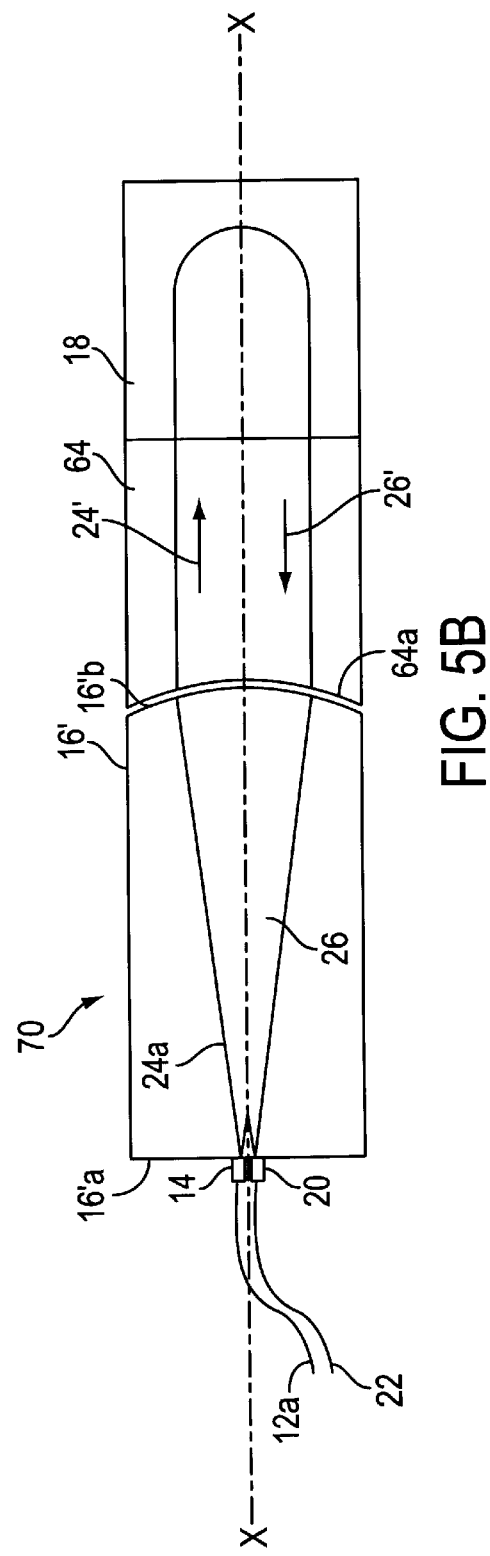

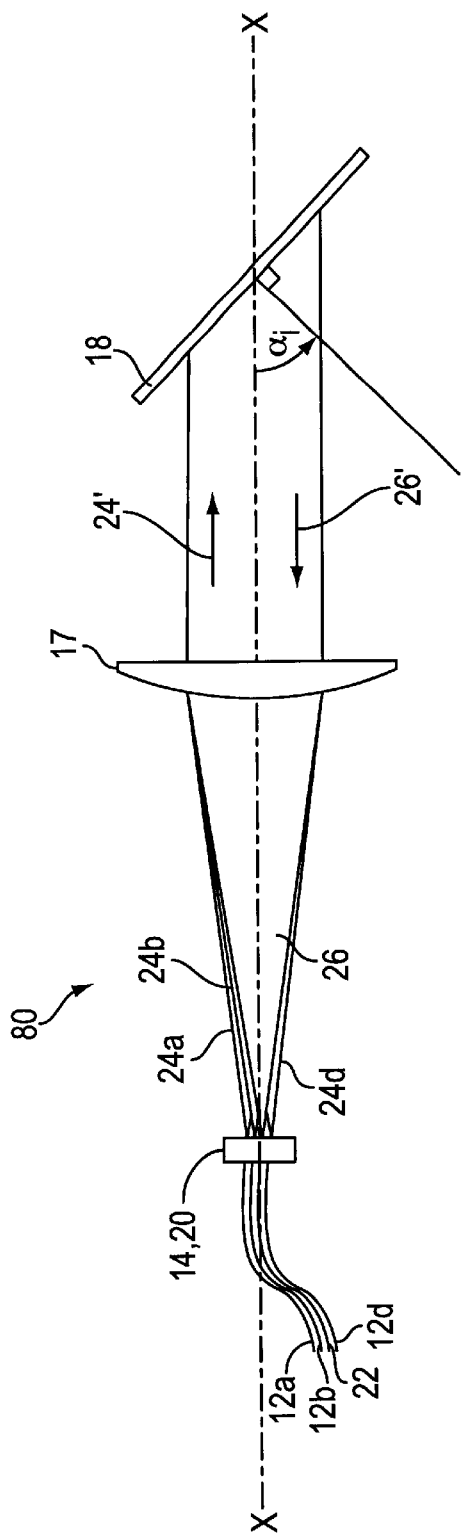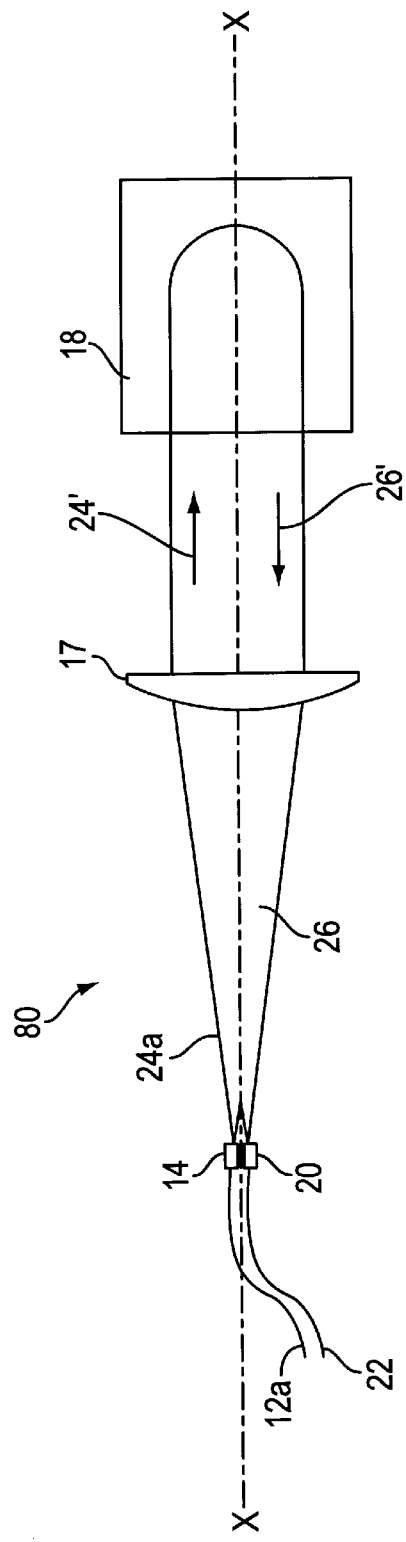

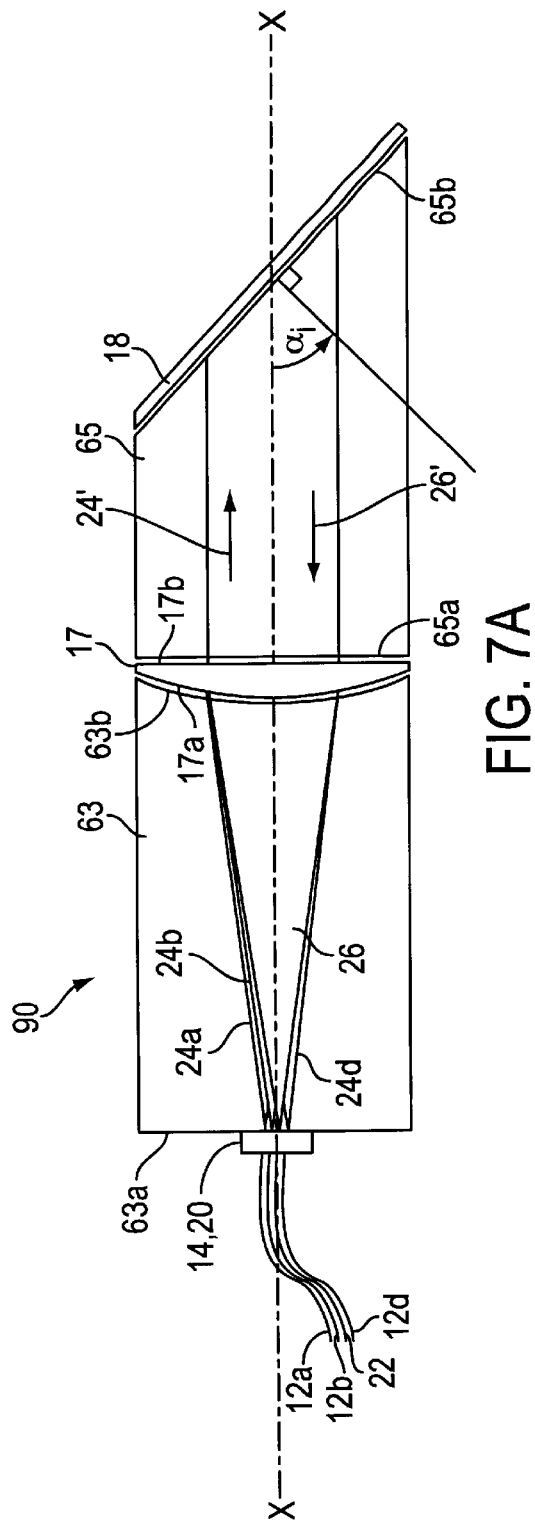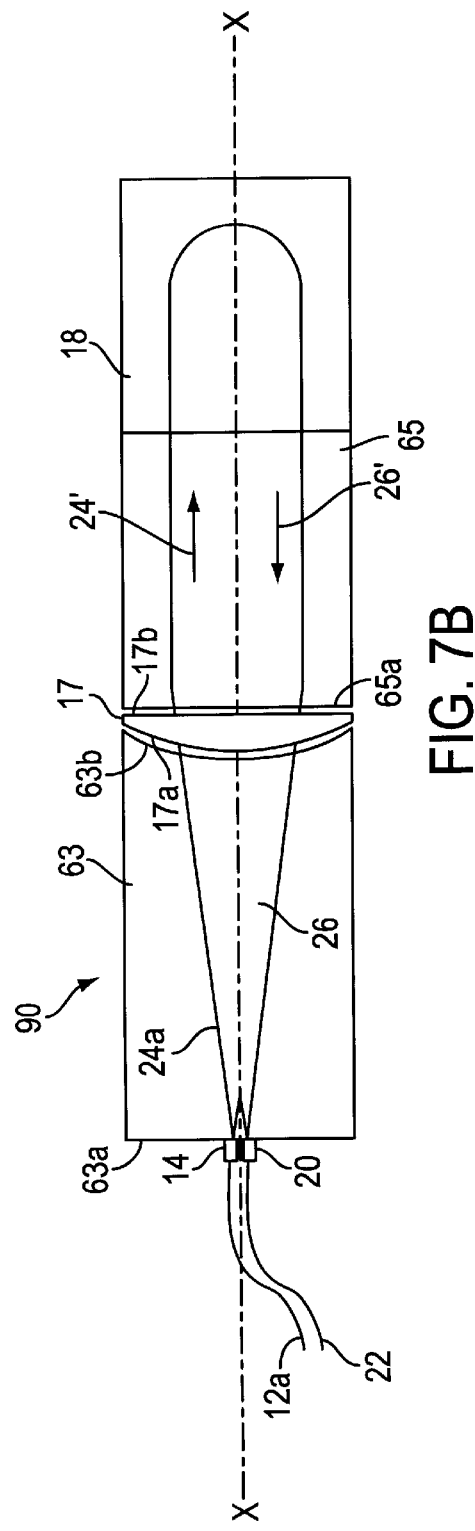

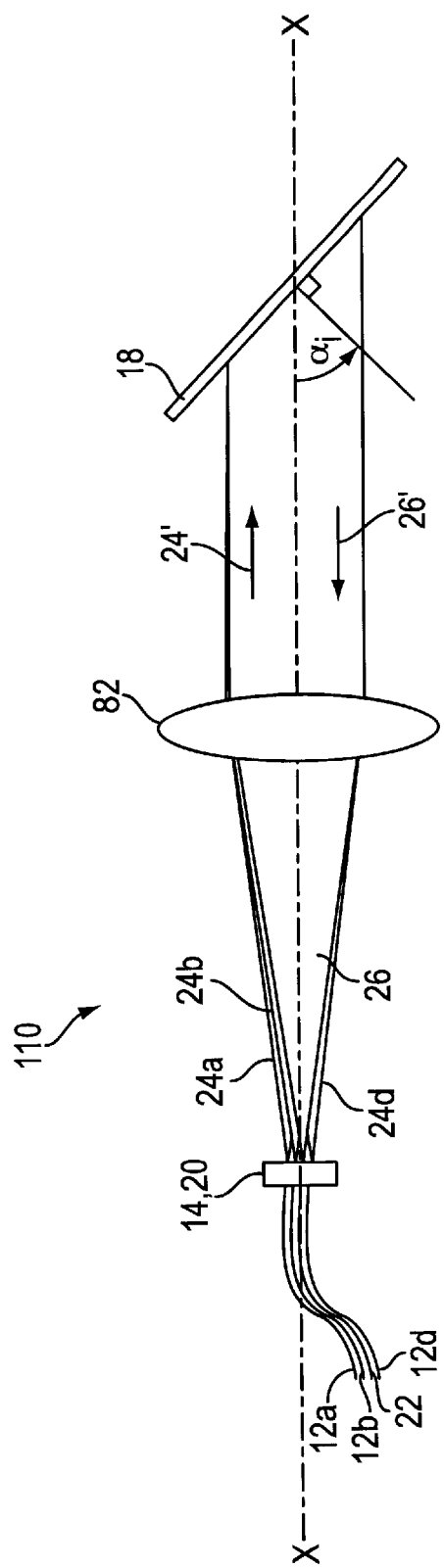
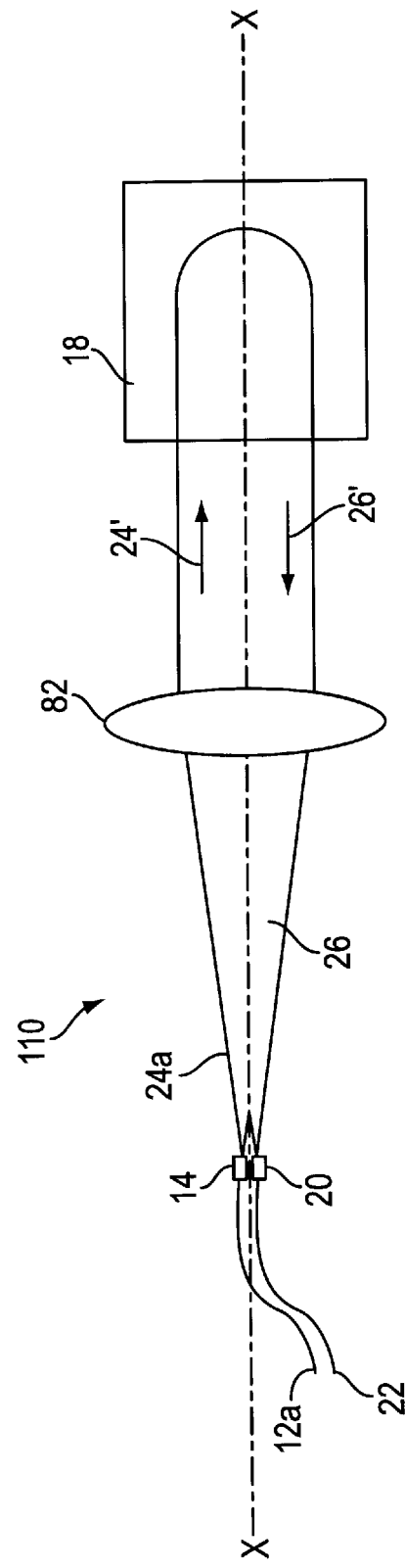

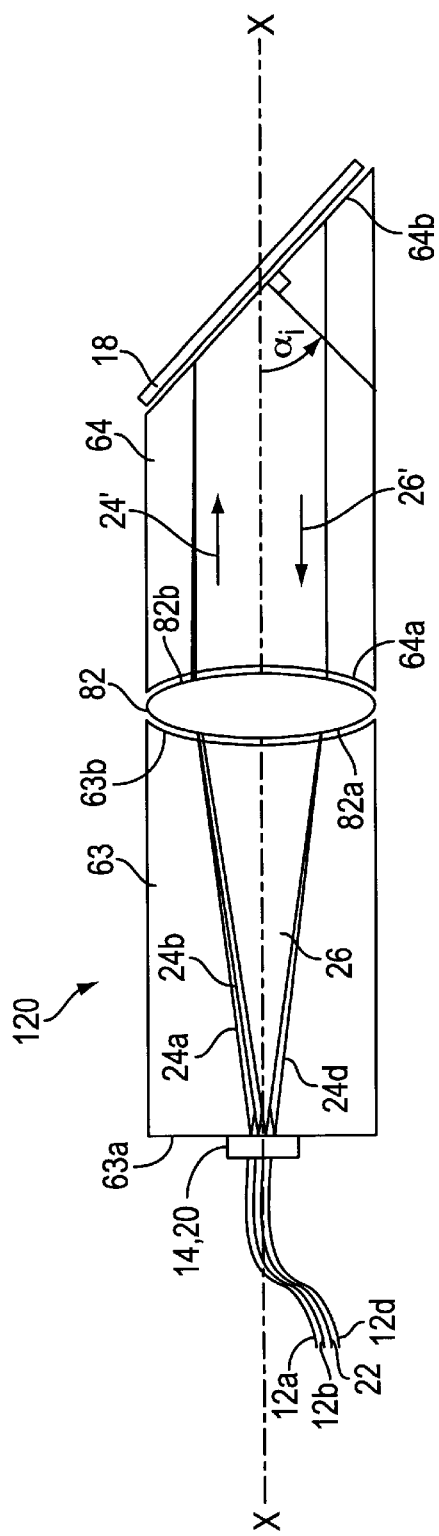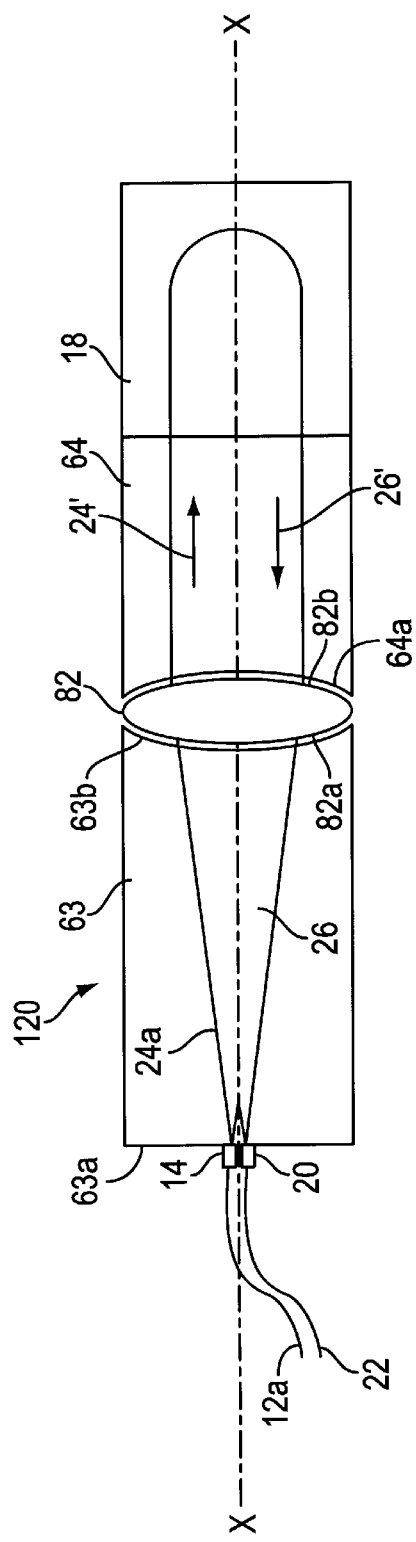

WAVELENGTH DIVISION MULTIPLEXING/DEMULTIPLEXING DEVICES USING HOMOGENEOUS REFRACTIVE INDEX LENSES

CROSS-REFERENCE TO RELATED APPLICATIONS

This patent application is a continuation-in-part patent application of U.S. patent application Ser. No. 08/990,197, filed Dec. 13, 1997, now U.S. Pat. No. 6,011,884, and U.S. Patent Application Ser. No. 08/990,199, filed Dec. 13, 1997, now U.S. Pat. No. 5,999,672, both of which are hereby incorporated by reference herein in their entirety.

This patent application is related to U.S. patent application Ser. No.09/382,624, now U.S. Pat. No. 6,271,970, filed concurrently herewith and hereby incorporated by reference herein in its entirety.

FIELD OF THE INVENTION

The present invention relates generally to wavelength division multiplexing/demultiplexing and, more particularly, to wavelength division multiplexing/demultiplexing devices using homogeneous refractive index lenses.

BACKGROUND OF THE INVENTION

Wavelength division multiplexing (WDM) is a rapidly emerging technology that enables a very significant increase in the aggregate volume of data that can be transmitted over optical fibers. Prior to the use of WDM, most optical fibers were used to unidirectionally carry only a single data channel at one wavelength. The basic concept of WDM is to launch and retrieve multiple data channels in and out, respectively, of an optical fiber. Each data channel is transmitted at a unique wavelength, and the wavelengths are appropriately selected such that the channels do not interfere with each other, and the optical transmission losses of the fiber are low. Today, commercial WDM systems exist that allow for the transmission of 2 to 100 simultaneous data channels.

WDM is a cost-effective method of increasing the volume of data (commonly termed bandwidth) transferred over optical fibers. Alternate competing technologies for increasing bandwidth include the burying of additional fiber optic cable or increasing the optical transmission rate over optical fiber. The burying of additional fiber optic cable is quite costly as it is presently on the order of $15,000 to $40,000 per kilometer. Increasing the optical transmission rate is limited by the speed and economy of the electronics surrounding the fiber optic system. One of the primary strategies for electronically increasing bandwidth has been to use time division multiplexing (TDM), which groups or multiplexes multiple lower rate electronic data channels together into a single very high rate channel. This technology has for the past 20 years been very effective for increasing bandwidth. However, it is now increasingly difficult to improve transmission speeds, both from a technological and an economical standpoint. WDM offers the potential of both an economical and technological solution to increasing bandwidth by using many parallel channels. Further, WDM is complimentary to TDM. That is, WDM can allow many simultaneous high transmission rate TDM channels to be passed over a single optical fiber.

The use of WDM to increase bandwidth requires two basic devices that are conceptually symmetrical. The first device is a wavelength division multiplexer. This device takes multiple beams, each with discrete wavelengths that are initially spatially separated in space, and provides a means for spatially combining all of the different wavelength beams into a single polychromatic beam suitable for launching into an optical fiber. The multiplexer may be a completely passive optical device or may include electronics that control or monitor the performance of the multiplexer. The input to the multiplexer is typically accomplished with optical fibers, although laser diodes or other optical sources may also be employed. As mentioned above, the output from the multiplexer is a single polychromatic beam which is typically directed into an optical fiber.

The second device for WDM is a wavelength division demultiplexer. This device is functionally the opposite of the wavelength division multiplexer. That is, the wavelength division demultiplexer receives a polychromatic beam from an optical fiber and provides a means of spatially separating the different wavelengths of the polychromatic beam. The output from the demultiplexer is a plurality of monochromatic beams which are typically directed into a corresponding plurality of optical fibers or photodetectors.

During the past 20 years, various types of WDMs have been proposed and demonstrated. For example, (1) W. J. Tomlinson, Applied Optics, Vol. 16, No. 8, pp. 2180–2194 (August 1977); (2) A. C. Livanos et al., Applied Physics Letters, Vol. 30, No. 10, pp. 519–521 (May 15, 1977); (3) H. Ishio et al., Journal of Lightwave Technology, Vol 2, No. 4, pp. 448–463 (August 1984); (4) H. Obara et al., Electronics Letters, Vol. 28, No. 13, pp. 1268–1270 (Jun. 18, 1992); (5) A. E. Willner et al., IEEE Photonics Technology Letters, Vol. 5, No. 7, pp. 838–841 (July 1993); and (6) Y. T. Huang et al., Optical Letters, Vol. 17, No. 22, pp. 1629–1631 (Nov. 15, 1992), all disclose some form of WDM device and/or method. However, most of the WDM devices and/or methods disclosed in the above-listed publications are classical optics-based WDM approaches which employ very basic lenses that are adequate only for use with multimode optical fibers and are inadequate for use with single mode optical fibers because the core diameter of a single mode optical fiber (i.e., typically 8 $\mu$m) is much smaller than the core diameter of a multimode optical fiber (i.e., typically 62.5 $\mu$m). That is, due to the very basic lenses employed therein, WDM devices incorporating the principles set forth in the classical optics-based WDM approaches disclosed in the above-listed publications are unable to receive and transmit optical beams from and to single mode optical fibers, respectively, without incurring unacceptable amounts of insertion loss and channel crosstalk. These unacceptable levels of insertion loss and channel crosstalk are largely due to the inadequate imaging capabilities of these very basic lenses, which are typically formed of standard optical glass materials.

One proposed solution to the above-described optical imaging problem has been to add additional lenses formed of standard optical glass materials to WDM devices, thereby resulting in WDM devices having doublet, triplet, and even higher number lens configurations. By adding these additional lenses to WDM devices, wherein the added lenses typically have alternating high and low refraction indexes, aberrations caused mainly by the spherical nature of the lenses are effectively canceled out. However, an increased cost is associated with adding these additional lenses due to the direct cost of the additional lenses, as well as the indirect costs associated with the increased complexity and resulting decreased manufacturability of WDM devices having multiple lenses.

Another proposed solution to the above-described optical imaging problem has been to use gradient refractive index lenses (e.g., Gradium lenses) in WDM devices. The use of these gradient refractive index lenses results in a significant improvement in the quality of the imaging system within WDM devices. However, costs associated with manufacturing these gradient refractive index lenses is significantly greater than the costs associated with manufacturing standard homogeneous refractive index lenses, despite the fact that both are typically formed of standard optical glass materials.

In view of the foregoing, there remains a real need for a WDM device which possesses or allows for all the characteristics of: low cost, component integration, environmental and thermal stability, low channel crosstalk, low channel signal loss, ease of interfacing, large number of channels, and narrow channel spacing. Accordingly, it would be desirable to provide a WDM device which overcomes the above-described inadequacies and shortcomings, while possessing or allowing for all of the above-stated characteristics.

OBJECTS OF THE INVENTION

The primary object of the present invention is to provide wavelength division multiplexing/demultiplexing devices which use homogeneous refractive index lenses to achieve increased device performance, as well as reduced device cost, complexity, and manufacturing risk.

The above-stated primary object, as well as other objects, features, and advantages, of the present invention will become readily apparent from the following detailed description which is to be read in conjunction with the appended drawings.

SUMMARY OF THE INVENTION

According to the present invention, an improved wavelength division multiplexing device is provided. In a preferred embodiment, the improved wavelength division multiplexing device has a diffraction grating for combining a plurality of monochromatic optical beams into a multiplexed, polychromatic optical beam. The improvement in the improved wavelength division multiplexing device comes from the use of a homogeneous refractive index collimating/focusing lens for collimating the plurality of monochromatic optical beams traveling along a first direction to the diffraction grating, and for focusing the multiplexed, polychromatic optical beam traveling along a second direction from the diffraction grating. The second direction is substantially opposite the first direction. The diffraction grating is preferably a reflective diffraction grating oriented at the Littrow diffraction angle with respect to the first and second directions.

The homogeneous refractive index collimating/focusing lens is typically a plano-convex homogeneous refractive index collimating/focusing lens, or a bi-convex homogeneous refractive index collimating/focusing lens, although other lens configurations are possible. For example, the homogeneous refractive index collimating/focusing lens can be spherical or aspherical. Also, the homogeneous refractive index collimating/focusing lens has a high refractive index and typically operates in the infrared (IR) region of the electromagnetic spectrum since this is the region where the power loss (attenuation) and dispersion of silica-based optical fibers is very low. Accordingly, the homogeneous refractive index collimating/focusing lens is typically formed of a high index of refraction glass material selected from the group consisting of SF59, PBH71, LAH78, and other high index of refraction glass materials that efficiently transmit optical beams in the infrared (IR) region of the electromagnetic spectrum.

In accordance with other aspects of the present invention the improvement in the improved wavelength division multiplexing device can be the use of a homogeneous refractive index collimating lens for collimating a plurality of monochromatic optical beams traveling along a first direction to the diffraction grating, and a homogeneous refractive index focusing lens for focusing a multiplexed, polychromatic optical beam traveling along a second direction from the diffraction grating. In this case, the second direction is different from, but not opposite, the first direction.

In accordance with other aspects of the present invention, an integrated wavelength division multiplexing device can be provided. That is, an integrated wavelength division multiplexing device can be provided comprising a homogeneous refractive index collimating/focusing lens for collimating a plurality of monochromatic optical beams traveling along a first direction, and for focusing a multiplexed, polychromatic optical beam traveling along a second direction. In this case, the second direction is again substantially opposite the first direction.

The integrated wavelength division multiplexing device also comprises a first homogeneous refractive index boot lens affixed to the homogeneous refractive index collimating/focusing lens for transmitting the plurality of monochromatic optical beams from the homogeneous refractive index collimating/focusing lens along the first direction, and for transmitting the multiplexed, polychromatic optical beam to the homogeneous refractive index collimating/focusing lens along the second direction. The first homogeneous refractive index boot lens has a planar interface surface.

The integrated wavelength division multiplexing device further comprises a diffraction grating formed at the planar interface surface of the first homogeneous refractive index boot lens for combining the plurality of monochromatic optical beams into the multiplexed, polychromatic optical beam, and for reflecting the multiplexed, polychromatic optical beam back into the first homogeneous refractive index boot lens. The diffraction grating is preferably a reflective diffraction grating oriented at the Littrow diffraction angle with respect to the first and second directions.

In accordance with further aspects of the present invention, the homogeneous refractive index boot lens can be incorporated into the homogeneous refractive index collimating/focusing lens such that the homogeneous refractive index collimating/focusing lens has the planar interface surface at which the diffraction grating is formed.

In accordance with still further aspects of the present invention, the homogeneous refractive index collimating/focusing lens can have a planar interface surface for accepting the plurality of monochromatic optical beams from at least one optical source (e.g., optical fibers, laser diodes), and for outputting the multiplexed, polychromatic optical beam to at least one optical receiver (e.g., optical fibers, photodetectors).

In accordance with still further aspects of the present invention, the integrated wavelength division multiplexing device further comprises a second homogeneous refractive index boot lens affixed to the homogeneous refractive index collimating/focusing lens for transmitting the plurality of monochromatic optical beams to the homogeneous refractive index collimating/focusing lens along the first direction, and for transmitting the multiplexed, polychromatic optical beam from the homogeneous refractive index collimating/focusing lens along the second direction. The second homogeneous refractive index boot lens preferably has a planar interface surface for accepting the plurality of monochromatic optical beams from at least one optical source, and for outputting the multiplexed, polychromatic optical beam to at least one optical receiver.

In accordance with other aspects of the present invention, a wavelength division multiplexing device can be provided. That is, a wavelength division multiplexing device can be provided comprising a homogeneous refractive index collimating lens for collimating a plurality of monochromatic optical beams, and a diffraction grating for combining the plurality of collimated, monochromatic optical beams into a multiplexed, polychromatic optical beam, and for reflecting the multiplexed, polychromatic optical beam. The wavelength division multiplexing device also comprises a homogeneous refractive index focusing lens for focusing the reflected, multiplexed, polychromatic optical beam.

In accordance with further aspects of the present invention, the wavelength division multiplexing device can further comprise at least one reflecting element for reflecting the plurality of collimated, monochromatic optical beams toward the diffraction grating, and/or at least one reflecting element for reflecting the reflected, multiplexed, polychromatic optical beam toward the homogeneous refractive index focusing lens.

At this point it should be noted that the above-described improved wavelength division multiplexing device, integrated wavelength division multiplexing device, and wavelength division multiplexing device are all bidirectional devices. Thus, the improved wavelength division multiplexing device can also be an improved wavelength division demultiplexing device, the integrated wavelength division multiplexing device can also be an integrated wavelength division demultiplexing device, and the wavelength division multiplexing device can also be a wavelength division demultiplexing device.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1b is a top view of the wavelength division multiplexing device shown in FIG. 1a.

FIG. 1c is a perspective end view of a portion of the wavelength division multiplexing device shown in FIG. 1a.

FIG. 2a is a perspective view of a coupling device containing a plurality of laser diodes for replacing the plurality of optical input fibers in the multiplexing device shown in FIG. 1a.

FIG. 2b is a perspective view of a coupling device containing a plurality of photodetectors for replacing the plurality of optical input fibers in the demultiplexing device shown in FIG. 3a.

FIG. 3b is a top view of the wavelength division multiplexing device shown in FIG. 3a.

FIG. 4a is a side view of an integrated wavelength division multiplexing device having a plano-convex homogeneous refractive index collimating/focusing lens and a reflective diffraction grating in accordance with the present invention.

FIG. 4b is a top view of the integrated wavelength division multiplexing device shown in FIG. 4a.

FIG. 5a is a side view of an integrated wavelength division multiplexing device having an extended plano-convex homogeneous refractive index collimating/focusing lens and a reflective diffraction grating in accordance with the present invention.

FIG. 5b is a top view of the integrated wavelength division multiplexing device shown in FIG. 5a.

FIG. 6a is a side view of a wavelength division multiplexing device having a convex-plano homogeneous refractive index collimating/focusing lens and a reflective diffraction grating in accordance with the present invention.

FIG. 6b is a top view of the wavelength division multiplexing device shown in FIG. 6a.

FIG. 7a is a side view of an integrated wavelength division multiplexing device having a convex-plano homogeneous refractive index collimating/focusing lens and a reflective diffraction grating in accordance with the present invention.

FIG. 7b is a top view of the integrated wavelength division multiplexing device shown in FIG. 7a.

FIG. 8b is a top view of the integrated wavelength division multiplexing device shown in FIG. 8a.

FIG. 9a is a side view of a wavelength division multiplexing device having a bi-convex homogeneous refractive index collimating/focusing lens and a reflective diffraction grating in accordance with the present invention.

FIG. 9b is a top view of the wavelength division multiplexing device shown in FIG. 9a.

FIG. 10a is a side view of an integrated wavelength division multiplexing device having a bi-convex homogeneous refractive index collimating/focusing lens and a reflective diffraction grating in accordance with the present invention.

FIG. 10b is a top view of the integrated wavelength division multiplexing device shown in FIG. 10a.

DETAILED DESCRIPTION OF PREFERRED EMBODIMENTS

Figure 1A:
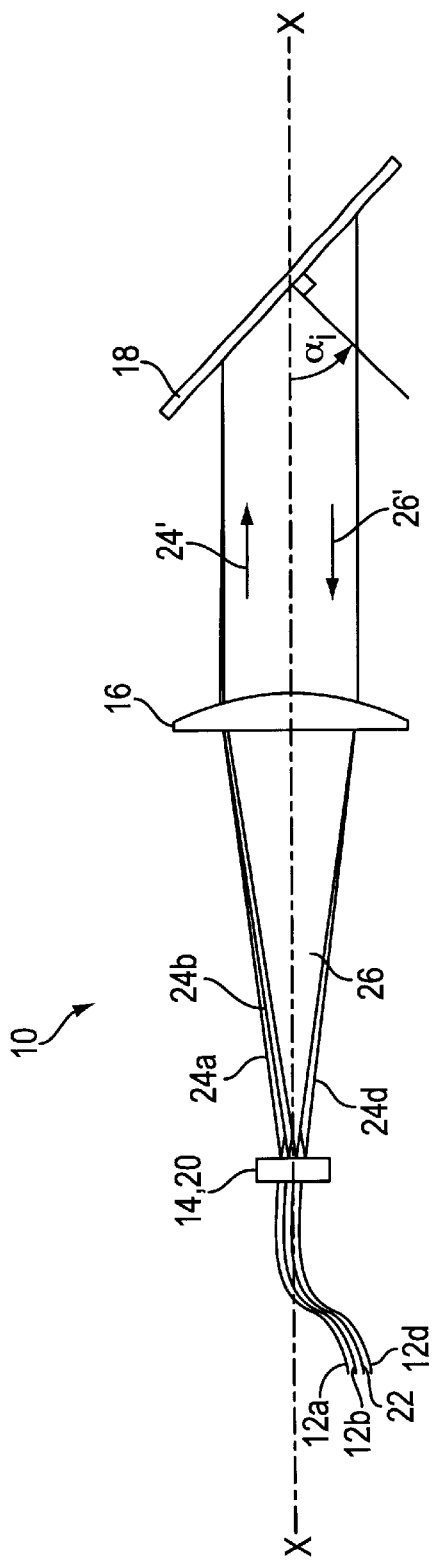
FIG. 1a is a side view of a wavelength division multiplexing device having a plano-convex homogeneous refractive index collimating/focusing lens and a reflective diffraction grating in accordance with the present invention.
Figure 1B:
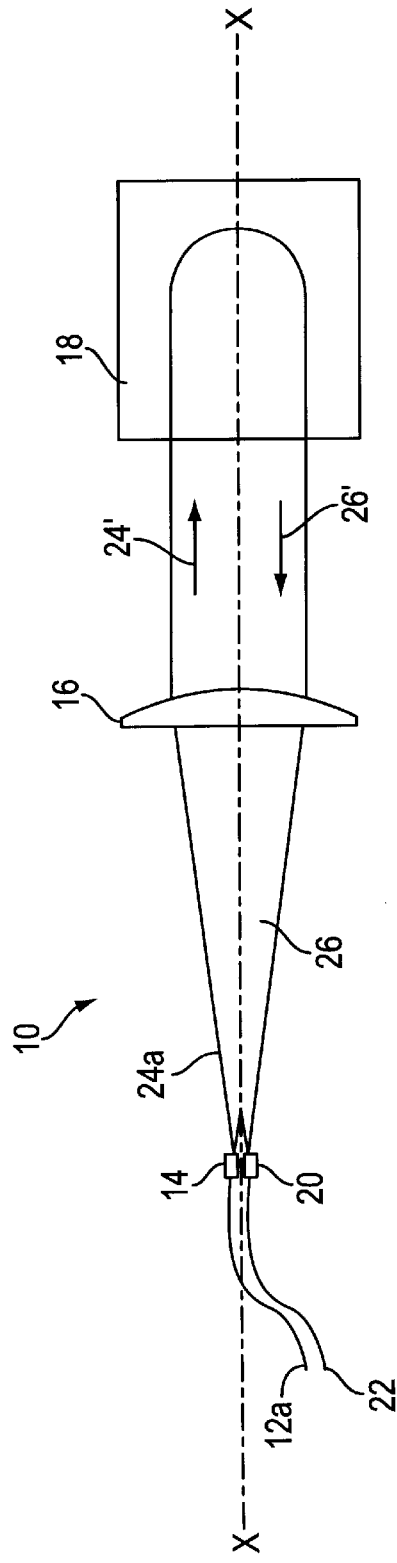

Referring to FIGS. 1a and 1b, there are shown a side view and a top view, respectively, of a preferred embodiment of a wavelength division multiplexing device 10 in accordance with the present invention. The multiplexing device 10 comprises a plurality of optical input fibers 12, an input fiber coupling device 14, a plano-convex homogeneous refractive index collimating/focusing lens 16, a reflective diffraction grating 18, an output fiber coupling device 20, and a single optical output fiber 22. All of the above-identified components of the multiplexing device 10 are disposed along an optical axis X-X of the multiplexing device 10, as will be described in more detail below.

At this point it should be noted that the optical input fibers 12 and the optical output fiber 22, as well as any other optical fibers described herein as being used in conjunction with WDM devices in accordance with the present invention, are single mode optical fibers. of course, however, this does not limit the present invention WDM devices to use with only single mode optical fibers. For example, the present invention WDM devices can also be used with multimode optical fibers.

It should also be noted that the multiplexing device 10, as well as any other WDM devices described herein as being WDM devices in accordance with the present invention, is operating in the infrared (IR) region of the electromagnetic spectrum as a dense wavelength division multiplexing (DWDM) device (i.e., operating with data channels having channel spacings of 1 nm or less). Of course, however, this does not limit the present invention WDM devices to being only DWDM devices. For example, the present invention WDM devices can also be standard WDM devices (i.e., operating with data channels having channel spacings greater than 1 nm).

Returning to FIGS 1a and 1b, the plurality of optical input fibers 12 are grouped into a one-dimensional input fiber array (i.e., a 1×4 array) by the input fiber coupling device 14, while the single optical output fiber 22 is secured to the output fiber coupling device 20. Both the input fiber coupling device 14 and the output fiber coupling device 20 are used for purposes of ease of optical fiber handling and precision placement, and can be formed of, for example, a silicon V-groove assembly. Referring to FIG. 1c, there is shown a perspective end view of a portion of the multiplexing device 10 revealing how the plurality of optical input fibers 12 are grouped into the one-dimensional input fiber array by the input fiber coupling device 14, and how the single optical output fiber 22 is secured to the output fiber coupling device 20. FIG. 1c also shows a monochromatic optical input beam 24 being transmitted from each of the plurality of optical input fibers 12, and a single multiplexed, polychromatic optical output beam 26 being transmitted to the single optical output fiber 22.

Each of the monochromatic optical input beams 24 being transmitted from the plurality of optical input fibers 12 is carrying a single channel of data at a unique wavelength, which is preferably, but not required to be, within the infrared (IR) region of the electromagnetic spectrum. The single channel of data that is being carried by each monochromatic optical input beam 24 is superimposed on each corresponding unique wavelength by means (e.g., laser diodes connected to the plurality of optical input fibers 12), which are not shown here and which do not form a part of this invention, but are well known in the art. The unique wavelengths of the monochromatic optical input beams 24 are appropriately preselected such that the data channels do not interfere with each other (i.e., there is sufficient channel spacing), and the optical transmission losses through both the optical input fibers 12 and the optical output fiber 22 are low, as is also well known in the art.

The single multiplexed, polychromatic optical output beam 26 being transmitted to the single optical output fiber 22 is carrying a plurality of channels of data at the unique wavelengths of each of the plurality of monochromatic optical input beams 24. The plurality of monochromatic optical input beams 24 are combined into the single multiplexed, polychromatic optical output beam 26 through the combined operation of the plano-convex homogeneous refractive index collimating/focusing lens 16 and the reflective diffraction grating 18, as will be described in more detail below.

At this point it should be noted that the input fiber coupling device 14 and the output fiber coupling device 20 are disposed offset from, but symmetrically about, the optical axis X-X of the multiplexing device 10 so as to insure that the single multiplexed, polychromatic optical output beam 26 is directed to the single optical output fiber 22 secured to the output fiber coupling device 20, and not to any of the plurality of optical input fibers 12 secured to the input fiber coupling device 14, or anywhere else. This offset spacing of the input fiber coupling device 14 and the output fiber coupling device 20 is determined based upon the focusing power of the plano-convex homogeneous refractive index collimating/focusing lens 16, as well as the characteristics of the diffraction grating 18 and the wavelengths of each of the monochromatic optical input beams 24.

Referring again to FIG. 1a and 1b, each of the plurality of monochromatic optical input beams 24 are transmitted from their corresponding optical input fiber 12 into the air space between the input fiber coupling device 14 and the plano-convex homogeneous refractive index collimating/focusing lens 16. Within this air space, the plurality of monochromatic optical input beams 24 are expanded in diameter until they become incident upon the plano-convex homogeneous refractive index collimating/focusing lens 16. The plano-convex homogeneous refractive index collimating/focusing lens 16 collimates each of the plurality of monochromatic optical input beams 24, and then transmits each collimated, monochromatic optical input beam 24' to the reflective diffraction grating 18.

At this point it should be noted that the optical axis of the plano-convex homogeneous refractive index collimating/focusing lens 16 coincides with the optical axis X-X of the multiplexing device 10 so as to insure that the single multiplexed, polychromatic optical output beam 26 is directed to the single optical output fiber 22 secured to the output fiber coupling device 20, and not to any of the plurality of optical input fibers 12 secured to the input fiber coupling device 14, or anywhere else, as will be described in more detail below.

The reflective diffraction grating 18 operates to angularly disperse the plurality of collimated, monochromatic optical input beams 24' by an amount that is dependent upon the wavelength of each of the plurality of collimated, monochromatic optical input beams 24'. Further, the reflective diffraction grating 18 is oriented at a special angle (i.e., the Littrow diffraction angle, $\alpha_L$) relative to the optical axis X-X of the multiplexing device 10 in order to obtain the Littrow diffraction condition for an optical beam having a wavelength that lies within or near the wavelength range of the plurality of collimated, monochromatic optical input beams 24'. The Littrow diffraction condition requires that an optical beam be incident on and reflected back from a reflective diffraction grating at the exact same angle. Therefore, it will be readily apparent to one skilled in the art that the reflective diffraction grating 18 is used to obtain near-Littrow diffraction for each of the plurality of collimated, monochromatic optical input beams 24'.

The Littrow diffraction angle, $\alpha_i$, is determined by the well-known diffraction grating equation, $$m\lambda = 2d(\sin \alpha_i)$$

wherein m is the diffraction order, $\lambda$ is the wavelength, d is the diffraction grating groove spacing, and $\alpha_i$ is the common angle of incidence and reflection. It will be readily apparent to one skilled in the art that the Littrow diffraction angle, $\alpha_i$, depends upon numerous variables, which may be varied as necessary to optimize the performance of the multiplexing device 10. For example, variables affecting the Littrow diffraction angle, $\alpha_i$, include the desired grating diffraction order, the grating blaze angle, the number of data channels, the spacing of the data channels, and the wavelength range of the multiplexing device 10.

At this point it should be noted that the reflective diffraction grating 18 can be formed from a variety of materials and by a variety of techniques. For example, the reflective diffraction grating 18 can be formed by a three-dimensional hologram in a polymer medium, or by replicating a mechanically ruled master with a polymer material. In both cases, the polymer is overcoated with a thin, highly reflective metal layer such as, for example, gold or aluminum. Alternatively, the reflective diffraction grating 18 can be formed by chemically etching into a planar material such as, for example, glass or silicon, which is also overcoated with a thin, highly reflective metal layer such as, for example, gold or aluminum.

As previously mentioned, the reflective diffraction grating 18 operates to angularly disperse the plurality of collimated, monochromatic optical input beams 24'. Thus, the reflective diffraction grating 18 removes the angular separation of the plurality of collimated, monochromatic optical input beams 24', and reflects a single collimated, polychromatic optical output beam 26' back towards the plano-convex homogeneous refractive index collimating/focusing lens 16. The single collimated, polychromatic optical output beam 26' contains each of the unique wavelengths of the plurality of collimated, monochromatic optical input beams 24'. Thus, the single collimated, polychromatic optical output beam 26' is a single collimated, multiplexed, polychromatic optical output beam 26'. The plano-convex homogeneous refractive index collimating/focusing lens 16 focuses the single collimated, multiplexed, polychromatic optical output beam 26', and then transmits the resulting single multiplexed, polychromatic optical output beam 26 to the output fiber coupling device 20 where it becomes incident upon the single optical output fiber 22. The single multiplexed, polychromatic optical output beam 26 is then coupled into the single optical output fiber 22 for transmission therethrough.

At this point it should again be noted that the input fiber coupling device 14 and the output fiber coupling device 20 are disposed offset from, but symmetrically about, the optical axis X-X of the multiplexing device 10 so as to insure that the single multiplexed, polychromatic optical output beam 26 is directed to the single optical output fiber 22 secured to the output fiber coupling device 20. However, in addition to this offset spacing of the input fiber coupling device 14 and the output fiber coupling device 20, the single multiplexed, polychromatic optical output beam 26 is also insured of being directed to the single optical output fiber 22 in a very efficient manner (i.e., with very low insertion losses and negligible channel crosstalk) by virtue of the enhanced imaging of both the input optical beams 24 and output optical beam 26 within the multiplexing device 10 which is obtained through the use of the plano-convex homogeneous refractive index collimating/focusing lens 16. In the embodiment of FIGS. 1a and 1b, this enhanced imaging of both the input optical beams 24 and output optical beam 26 within the multiplexing device 10 is a direct result of the plano-convex homogeneous refractive index collimating/focusing lens 16 being formed of a high index of refraction glass material, as described in more detail below.

The use of a high index of refraction glass material to form the plano-convex homogeneous refractive index collimating/focusing lens 16 insures that the multiplexing device 10 operates in a very efficient manner (i.e., with very low insertion losses and negligible channel crosstalk) due to the fact that a large difference exists between the high index of refraction of the plano-convex homogeneous refractive index collimating/focusing lens 16 and the much lower index of refraction of the air spaces adjacent to the lens 16. This large difference between the high index of refraction of the plano-convex homogeneous refractive index collimating/focusing lens 16 and the much lower index of refraction of the adjacent air spaces allows for the highly efficient collimation and focusing of the input optical beams 24 and output optical beam 26, respectively, by the plano-convex homogeneous refractive index collimating/focusing lens 16, while simultaneously minimizing the amount of wavelength distortion that is introduced into the optical system of the multiplexing device by this lens 16. Furthermore, this large difference between the high index of refraction of the plano-convex homogeneous refractive index collimating/focusing lens 16 and the much lower index of refraction of the adjacent air spaces is much greater than can be achieved using lenses formed of standard optical glasses because standard optical glasses have index of refraction values that are much lower than high index of refraction glass materials. Thus, the efficiencies that are achieved by using a high index of refraction glass material to form the plano-convex homogeneous refractive index collimating/focusing lens 16 are greater than can be achieved using lenses formed of standard optical glasses.

Examples of high index of refraction glass materials which can be used to form the plano-convex homogeneous refractive index collimating/focusing lens 16 include SF59 (manufactured by Schott Glass Technologies with n=1.896@1550 nm), PBH71 (manufactured by Ohara Corporation with n =1.870@1550 nm), LAH78 (manufactured by Ohara Corporation with n=1.860@1550 nm), and any of a number of other appropriate high index of refraction glass materials that efficiently transmit optical beams in the infrared (IR) region of the electromagnetic spectrum, since this is the region where the power loss (attenuation) and dispersion of silica-based optical fibers is very low. In fact, most WDM devices are used in the window of 1530–1610 nm, which is the range over which erbium-doped fiber amplifiers (EDFAs) operate and optical fibers have low loss. This 1530–1610 nm region is often called the "third window" for optical fibers. Similarly, however, some WDM devices are also used in the so-called "second window" for optical fibers (i.e., typically within the window of 1300–1330 nm) where optical fibers have very low dispersion and low loss. Consequently, most prior art WDM devices use standard optical glasses that transmit efficiently in these IR regions. For example, standard optical glasses such as FK3 (manufactured by Schott Glass Technologies with n=1.450@1550 nm), BK7 (manufactured by Schott Glass Technologies with n=1.501@1550 nm), K5 (manufactured by Schott Glass Technologies with n=1.506@1550 nm), and Gradium have optical transmission efficiencies of 97–99% for one-inch material thicknesses in these IR regions. This level of transmission efficiency is generally adequate, but, as previously mentioned, there are cost considerations associated with the use of these materials for lenses in WDM devices (i.e., increased component costs for WDM devices requiring multiple lenses formed of standard optical glass materials, and increased fabrication costs for gradient refractive index lenses). Furthermore, all of these standard optical glasses have index of refraction values (i.e., typically n≈1.5@1550 nm) that are much lower than the index of refraction values of high index of refraction glass materials (i.e., typically n≈1.9@1550 nm).

An additional benefit to using a high index of refraction glass material to form the plano-convex homogeneous refractive index collimating/focusing lens 16 is that the use of a high index of refraction glass material allows the collimating/focusing lens 16 to be a plano-convex singlet instead of a bi-convex singlet, doublet, or even higher number lens configuration. That is, the focusing power of only one curved surface on the plano-convex homogeneous refractive index collimating/focusing lens 16 is sufficient to provide essentially diffraction-limited collimation/focusing. It should be noted, however, that the above does not preclude the collimating/focusing lens 16 from being a bi-convex homogeneous refractive index collimating/focusing singlet, doublet, or even higher number lens configuration. To the contrary, if the collimating/focusing lens 16 is a bi-convex homogeneous refractive index collimating/focusing singlet, doublet, or even higher number lens configuration, the imaging of both the input optical beams 24 and output optical beam 26 within the multiplexing device 10 is improved even more, as will be discussed in more detail below.

A further benefit to using a high index of refraction glass material to form the plano-convex homogeneous refractive index collimating/focusing lens 16 is that the high index of refraction glass material can be used to lessen, and possibly even eliminate, aberrations caused by the spherical nature of the lens 16. These aberrations are lessened because the much greater refractive index of the high index of refraction glass material allows the radius of the plano-convex homogeneous refractive index collimating/focusing lens 16 to be greatly increased (i.e., the lens has much less curvature), thereby resulting in much less spherical and other aberrations. For example, if the plano-convex homogeneous refractive index collimating/focusing lens 16 were to be fabricated of SF59 (manufactured by Schott Glass Technologies with n=1.896@1550 nm), then, everything else remaining the same, the required radius of the lens 16 would be much greater (i.e., the lens would have less curvature or be less steep) than if the lens 16 were to be fabricated of a typical optical glass such as FK3 (manufactured by Schott Glass Technologies with n=1.450@1550 nm) due to the large difference between the refractive index values of SF59 and air (i.e., 1.896−1.0=0.896) in comparison to the lesser difference between the refractive index values of FK3 and air (i.e., 1.450−1.0=0.450). That is, the difference between the refractive index values of SF59 and air is almost two times greater than the difference between the refractive index values of FK3 and air. Accordingly, the radius of the lens 16 if fabricated of SF59 is allowed to be almost two times greater than the radius of the lens 16 if fabricated of FK3. Further, aberrations caused by the spherical nature of the lens 16 are also typically reduced by this same factor (i.e., by approximately 2X).

The above-described ability to decrease the level of aberrations in the multiplexing device 10 by using a high index of refraction glass material to form the plano-convex homogeneous refractive index collimating/focusing lens 16 is very significant. This discovery insures that the use of high index of refraction glass materials will result in a very large amount (or degree) of lens design freedom. The high index of refraction can be used either to make the curvature of a lens less steep, or to simplify the number and/or complexity of the lenses that are used in a WDM device.

At this point it should be noted that the plano-convex homogeneous refractive index collimating/focusing lens 16, as well as any other homogeneous refractive index collimating/focusing lens described herein as being used in WDM devices in accordance with the present invention, may be spherical or aspherical in shape. Although spherical lenses are more common than aspherical lenses, mainly due to the fact that they are easier to manufacture, the performance of a WDM device may be further improved by using an aspherical homogeneous refractive index collimating/focusing lens instead of a spherical homogeneous refractive index collimating/focusing lens. That is, the curvature at the edges of an aspherical homogeneous refractive index collimating/focusing lens is less steep than the curvature at the edges of a spherical homogeneous refractive index collimating/focusing lens, thereby resulting in even further reductions in the level of spherical aberrations in a WDM device incorporating such an aspherical homogeneous refractive index collimating/focusing lens.

At this point it should also be noted that the plano-convex homogeneous refractive index collimating/focusing lens 16, as well as any other homogeneous refractive index collimating/focusing lens described herein as being used in WDM devices in accordance with the present invention, is typically coated with an anti-reflection material due to the high index of refraction of the glass material.

At this point it should be noted that the plurality of optical input fibers 12 could be replaced in the multiplexing device 10 by a corresponding plurality of laser diodes 28 secured within a coupling device 30, such as shown in FIG. 2a. The coupling device 30 performs a similar function to the input fiber coupling device 14, that being to precisely group the plurality of laser diodes 28 into a one-dimensional input array. The plurality of laser diodes 28 are used in place of the plurality of optical input fibers 12 to transmit the plurality of monochromatic optical input beams 24 to the multiplexing device 10. The array of laser diodes 28 may operate alone, or may be used with appropriate focusing lenses to provide the best coupling and the lowest amount of signal loss and channel crosstalk.

Figure 3A:
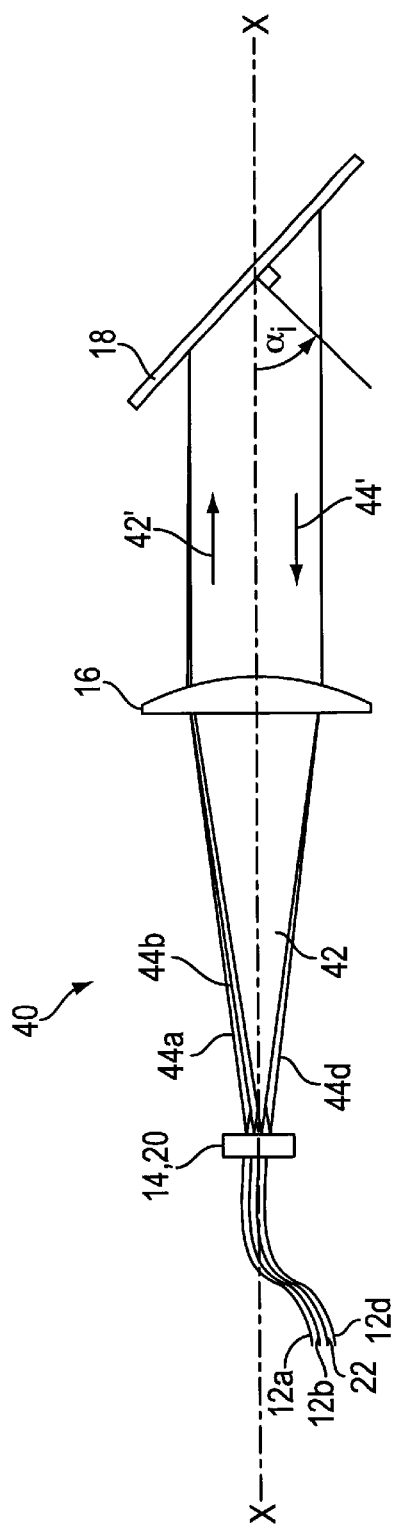
FIG. 3a is a side view of a wavelength division demultiplexing device having a plano-convex homogeneous refractive index collimating/focusing lens and a reflective diffraction grating in accordance with the present invention.
Figure 3B:
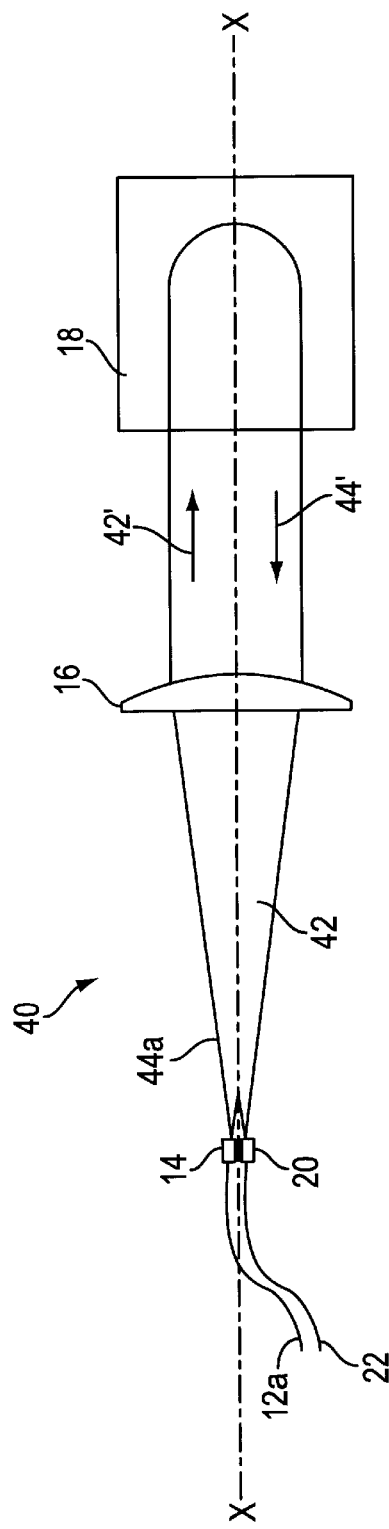

At this point it should be noted that the multiplexing device 10, as well as all of the multiplexing devices described herein, may be operated in a converse configuration as a demultiplexing device 40, such as shown in FIGS. 3a and 3b. The demultiplexing device 40 is physically identical to the multiplexing device 10, and is therefore numerically identified as such. However, the demultiplexing device 40 is functionally opposite to the multiplexing device 10. That is, a single multiplexed, polychromatic optical input beam 42 is transmitted from the single optical fiber 22, and a plurality of monochromatic optical output beams 44 are transmitted to the plurality of optical fibers 12, wherein each one of the plurality of monochromatic optical output beams 44 is transmitted to a corresponding one of the plurality of optical fibers 12. The single multiplexed, polychromatic optical input beam 42 is simultaneously carrying a plurality of channels of data, each at a unique wavelength which is preferably, but not required to be, within the infrared (IR) region of the electromagnetic spectrum. The plurality of monochromatic optical output beams 44 are each carrying a single channel of data at a corresponding one of the unique wavelengths of the single multiplexed, polychromatic optical input beam 42. The single multiplexed, polychromatic optical input beam 42 is separated into the plurality of monochromatic optical output beams 44 through the combined operation of the plano-convex homogeneous refractive index collimating/focusing lens 16 and the reflective diffraction grating 18. Thus, the plano-convex homogeneous refractive index collimating/focusing lens 16 and the reflective diffraction grating 18 operate to perform a demultiplexing function.

At this point it should be noted that the plurality of optical fibers 12 could be replaced in the demultiplexing device 40 by a corresponding plurality of photodetectors 48 secured within a coupling device 50, such as shown in FIG. 2b. The coupling device 50 performs a similar function to the fiber coupling device 14, that being to precisely group the plurality of photodetectors 48 into a one-dimensional input array. The plurality of photodetectors 48 are used in place of the plurality of optical fibers 12 to receive the plurality of monochromatic optical output beams 44 from the demultiplexing device 40. The array of photodetectors 48 may operate alone, or may be used with appropriate focusing lenses to provide the best coupling and the lowest amount of signal loss and channel crosstalk.

Referring to FIGS. 4a and 4b, there are shown a side view and a top view, respectively, of an alternate embodiment of a wavelength division multiplexing device 60 in accordance with the present invention. The multiplexing device 60 is physically identical to the multiplexing device 10, except for the addition of a first homogeneous refractive index boot lens 62 between the fiber coupling devices 14, 20 and the plano-convex homogeneous refractive index collimating/focusing lens 16, and a second homogeneous refractive index boot lens 64 between the plano-convex homogeneous refractive index collimating/focusing lens 16 and the reflective diffraction grating 18. The first homogeneous refractive index boot lens 62 and the second homogeneous refractive index boot lens 64 are preferably fabricated of, for example, fused silica (manufactured by Schott Glass Technologies with n=1.444@1550 nm), although numerous other low index of refraction optical glass materials may also be used.

The first homogeneous refractive index boot lens 62 has a planar front surface 62a for mating with the fiber coupling devices 14 and 20 and the associated secured optical fibers 12 and 22, respectively. The fiber coupling devices 14 and 20 and the secured optical fibers 12 and 22 may be either abutted against the planar front surface 62a or affixed to the planar front surface 62a using optical cement or some other optically transparent bonding technique, depending upon system mobility requirements and optical beam alignment and loss considerations.

The first homogeneous refractive index boot lens 62 also has a planar back surface 62b for mating with a planar front surface 16a of the plano-convex homogeneous refractive index collimating/focusing lens 16. The planar back surface 62b of the first homogeneous refractive index boot lens 62 is typically joined or affixed to the planar front surface 16a of the plano-convex homogeneous refractive index collimating/focusing lens 16 using optical cement or some other optically transparent bonding technique.

The second homogeneous refractive index boot lens 64 has a concave front surface 64a for mating with a convex back surface 16b of the plano-convex homogeneous refractive index collimating/focusing lens 16. The concave front surface 64a of the second homogeneous refractive index boot lens 64 is typically joined or affixed to the convex back surface 16b of the plano-convex homogeneous refractive index collimating/focusing lens 16 using optical cement or some other optically transparent bonding technique.

The second homogeneous refractive index boot lens 64 also has a planar back surface 64b that is angled similar to the reflective diffraction grating 18 at the Littrow diffraction angle, $\alpha_i$, relative to the optical axis X-X of the multiplexing device 60. As with the multiplexing device 10, the reflective diffraction grating 18 can be formed using a separate material, and this material can then be joined or affixed to the planar back surface 64b of the second homogeneous refractive index boot lens 64 using optical cement or some other optically transparent bonding technique. Alternatively, the reflective diffraction grating 18 can be formed directly on the planar back surface 64b of the second homogeneous refractive index boot lens 64, thereby avoiding the joining or affixing of the reflective diffraction grating 18 to the planar back surface 64b of the second homogeneous refractive index boot lens 64. In either case, the reflective diffraction grating 18 and the second homogeneous refractive index boot lens 64 are integrated along with the plano-convex homogeneous refractive index collimating/focusing lens 16 and the first homogeneous refractive index boot lens 62 to form a compact, rigid, and environmentally and thermally stable multiplexing device 60. The integrated nature of this multiplexing device 60 is particularly useful for maintaining component alignment, which provides long-term performance in contrast to some non-integrated air-spaced devices that characteristically degrade in alignment and therefore performance over time.

The multiplexing device 60 is functionally identical to the multiplexing device 10, except for a slight decrease in optical beam transmission efficiency due to the addition of the first and second homogeneous refractive index boot lenses 62 and 64, respectively. However, even with this slight decrease in optical beam transmission efficiency, the optical performance of the multiplexing device 60 is still exceptional due to the use of a high index of refraction glass material to form the plano-convex homogeneous refractive index collimating/focusing lens 16. That is, as previously described, the high index of refraction glass material can be used to lessen, and possibly even eliminate, aberrations caused by the spherical nature of the lens 16. And these aberrations are still lessened despite the addition of the first and second homogeneous refractive index boot lenses 62 and 64, respectively. For example, if the first and second homogeneous refractive index boot lenses 62 and 64, respectively, were to be fabricated of a first type of standard optical glass (e.g., fused silica manufactured by Schott Glass Technologies with n=1.444@1550 nm) and if the plano-convex homogeneous refractive index collimating/focusing lens 16 were to be fabricated of SF59 (manufactured by Schott Glass Technologies with n=1.896@1550 nm), then, everything else remaining the same, the required radius of the lens 16 would be much greater (i.e., the lens would have less curvature or be less steep) than if the lens 16 were to be fabricated of a second type of standard optical glass (e.g., BK7 manufactured by Schott Glass Technologies with n=1.501@1550 nm) due to the large difference between the refractive index values of SF59 and fused silica (i.e., 1.896−1.444=0.452) in comparison to the lesser difference between the refractive index values of BK7 and fused silica (i.e., 1.501−1.444=0.057). That is, the difference between the refractive index values of SF59 and fused silica is 7.93 times greater than the difference between the refractive index values of BK7 and fused silica. Accordingly, the radius of the lens 16 if fabricated of SF59 is allowed to be 7.93 times greater than the radius of the lens 16 if fabricated of BK7.

Further, aberrations caused by the spherical nature of the lens 16 are also typically reduced by this same factor (i.e., by 7.93 times).

Referring to FIGS. 5a and 5b, there are shown a side view and a top view, respectively, of an alternate embodiment of a wavelength division multiplexing device 70 in accordance with the present invention. The multiplexing device 70 is physically identical to the multiplexing device 60, except that the first homogeneous refractive index boot lens 62 has been removed and the planar front surface 16'a of the plano-convex homogeneous refractive index collimating/focusing lens 16' has been extended so as to allow the fiber coupling devices 14, 20 and the secured optical fibers 12 and 22, respectively, to be either abutted against the planar front surface 16'a or affixed to the planar front surface 16'a using optical cement or some other optically transparent bonding technique, depending upon system mobility requirements and optical beam alignment and loss considerations. Similar to the multiplexing device 60, the integrated nature of the multiplexing device 70 is particularly useful for maintaining component alignment, which provides long-term performance in contrast to some non-integrated air-spaced devices that characteristically degrade in alignment and therefore performance over time. The multiplexing device 70 is functionally identical to the multiplexing device 60, except for a slight increase in optical beam transmission efficiency due to the removal of the first homogeneous refractive index boot lens 62.

At this point it should be noted that the plano-convex homogeneous refractive index collimating/focusing lens 16, as shown in the multiplexing device 10 of FIGS. 1a and 1b, may be replaced by a convex-plano homogeneous refractive index collimating/focusing lens 17 to form an alternate embodiment of a wavelength division multiplexing device 80 in accordance with the present invention as shown in FIGS. 6a and 6b. The multiplexing device 80 of FIGS. 6a and 6b realizes the above-described benefits of using a high index of refraction glass material to form the plano-convex homogeneous refractive index collimating/focusing lens 16 in the multiplexing device of FIGS. 1a and 1b. That is, the above-described benefits of using a high index of refraction glass material to form the plano-convex homogeneous refractive index collimating/focusing lens 16 in multiplexing device 10 of FIGS. 1a and 1b are also realized when using a high index of refraction glass material to form the convex-plano homogeneous refractive index collimating/focusing lens 17 in multiplexing device 80 of FIGS. 6a and 6b. The multiplexing device 80 is functionally identical to the multiplexing device 10.

At this point it should be noted, similar to the multiplexing device 60 of FIGS. 4a and 4b, homogeneous refractive index boot lenses can be added to the multiplexing device 80 of FIGS. 6a and 6b to form an alternate embodiment of a wavelength division multiplexing device 90 in accordance with the present invention as shown in FIGS. 7a and 7b. The multiplexing device 90 of FIGS. 7a and 7b realizes the above-described benefits of using homogeneous refractive index boot lenses in the multiplexing device 60 of FIGS. 4a and 4b. That is, the above-described benefits of using the first homogeneous refractive index boot lens 62 and the second homogeneous refractive index boot lens 64 in multiplexing device 60 of FIGS. 4a and 4b are also realized when using a first homogeneous refractive index boot lens 63 and a second homogeneous refractive index boot lens 65 in multiplexing device 90 of FIGS. 7a and 7b. Similar to the multiplexing device 60, the integrated nature of the multiplexing device 90 is particularly useful for maintaining component alignment, which provides long-term performance in contrast to some non-integrated air-spaced devices that characteristically degrade in alignment and therefore performance over time. The multiplexing device 90 is functionally identical to the multiplexing device 60.

Figure 8A:
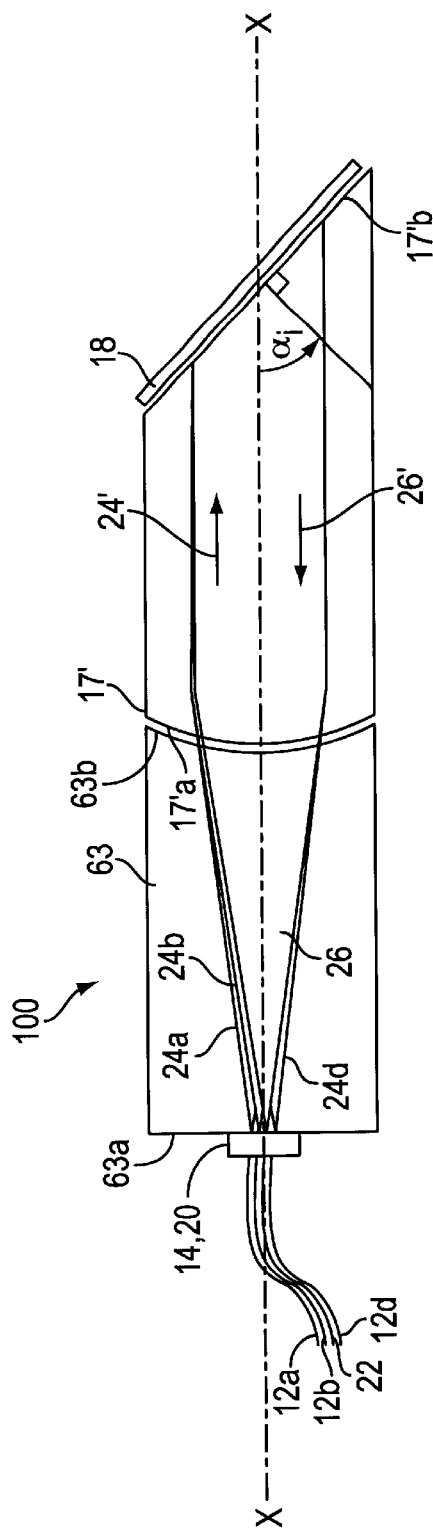
FIG. 8a is a side view of an integrated wavelength division multiplexing device having an extended convex-plano homogeneous refractive index collimating/focusing lens and a reflective diffraction grating in accordance with the present invention.
Figure 8B:
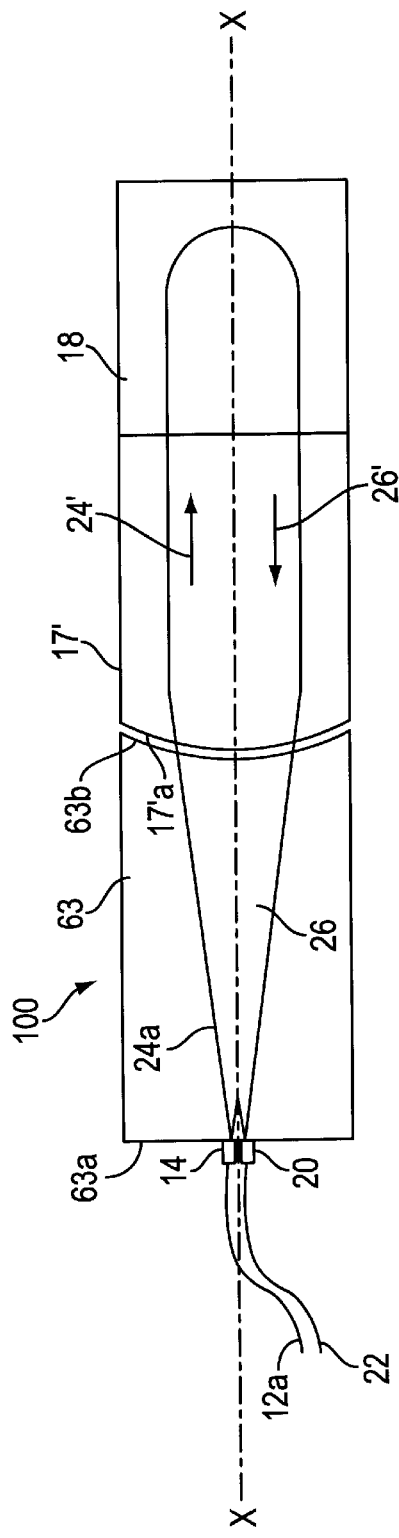

At this point it should be noted that the second homogeneous refractive index boot lens 65 can be removed from the multiplexing device 90 of FIGS. 7a and 7b, and the back surface 17'b of the convex-plano homogeneous refractive index collimating/focusing lens 17' can be extended out to the reflective diffraction grating 18 to form an alternate embodiment of a wavelength division multiplexing device 100 in accordance with the present invention as shown in FIGS. 8a and 8b. The back surface 17'b of the convex-plano homogeneous refractive index collimating/focusing lens 17' is angled similar to the reflective diffraction grating 18 at the Littrow diffraction angle, $\alpha_i$, relative to the optical axis X-X of the multiplexing device 100. As with all of the previously described embodiments, the reflective diffraction grating 18 can be formed using a separate material, and this material can then be joined or affixed to the planar back surface 17'b of the convex-plano homogeneous refractive index collimating/focusing lens 17' using optical cement or some other optically transparent bonding technique. Alternatively, the reflective diffraction grating 18 can be formed directly on the planar back surface 17'b of the convex-plano homogeneous refractive index collimating/focusing lens 17', thereby avoiding the joining or affixing of the reflective diffraction grating 18 to the planar back surface 17'b of the convex-plano homogeneous refractive index collimating/focusing lens 17'. In either case, the reflective diffraction grating 18 and the convex-plano homogeneous refractive index collimating/focusing lens 17' are integrated along with the first homogeneous index boot lens 63 to form a compact, rigid, and environmentally and thermally stable multiplexing device 100. Similar to the multiplexing device 70, the integrated nature of the multiplexing device 100 is particularly useful for maintaining component alignment, which provides long-term performance in contrast to some non-integrated air-spaced devices that characteristically degrade in alignment and therefore performance over time. The multiplexing device 100 is functionally identical to the multiplexing device 70.

At this point it should be noted that either the first homogeneous refractive index boot lens 62 or the second homogeneous refractive index boot lens 64 may be removed from the multiplexing device 60, the second homogeneous refractive index boot lens 64 may be removed from the multiplexing device 70, either the first homogeneous refractive index boot lens 63 or the second homogeneous refractive index boot lens 65 may be removed from the multiplexing device 90, and the first homogeneous refractive index boot lens 63 may be removed from the multiplexing device 100, in order to create additional alternate embodiments (not shown) while still retaining the above-described benefits of using a high index of refraction glass material to form the plano-convex homogeneous refractive index collimating/focusing lens 16 or the convex-plano homogeneous refractive index collimating/focusing lens 17. Referring to FIGS. 9a and 9b, there are shown a side view and a top view, respectively, of an alternate embodiment of a wavelength division multiplexing device 110 in accordance with the present invention. The multiplexing device 110 is physically identical to the multiplexing device 10, except that the plano-convex homogeneous refractive index collimating/focusing lens 16 has been replaced by a bi-convex homogeneous refractive index collimating/ focusing lens 82 so as to further enhance the imaging of both the input optical beams 24 and output optical beam 26 within the multiplexing device 110. That is, the additional curved surface of the bi-convex homogeneous refractive index collimating/focusing lens 82 provides additional imaging capability, thereby increasing the fiber coupling efficiency (FCE) of the multiplexing device 110. In contrast to a measure of insertion loss, the FCE of a WDM device expresses the efficiency of only the optical system of the WDM device for each data channel, without taking into account the efficiency of the diffraction grating. Comparatively, the use of the bi-convex homogeneous refractive index collimating/focusing lens 82 instead of the plano-convex homogeneous refractive index collimating/focusing lens 16 typically results in an increase in the FCE of approximately 1% for the configuration of WDM devices shown in FIGS. 1 and 9. Thus, a trade-off must be made between a small increase in the FCE and the additional cost associated with fabricating a lens having an additional curved surface. Of course, further increases in the FCE can typically be achieved using doublet, triplet, or even higher number lens configurations.

Referring to FIGS. 10a and 10b, there are shown a side view and a top view, respectively, of an alternate embodiment of a wavelength division multiplexing device 120 in accordance with the present invention. The multiplexing device 120 is physically identical to the multiplexing device 60, except that the plano-convex homogeneous refractive index collimating/focusing lens 16 has been replaced by a bi-convex homogeneous refractive index collimating/focusing lens 82, and the first homogeneous refractive index boot lens 62 has been replaced by the first homogeneous refractive index boot lens 63. As with the multiplexing device 110, the replacement of the plano-convex homogeneous refractive index collimating/focusing lens 16 with the bi-convex homogeneous refractive index collimating/focusing lens 82 in the multiplexing device 90 has been done to further enhance the imaging of both the input optical beams 24 and output optical beam 26 within the multiplexing device 120. The first homogeneous refractive index boot lens 62 has been replaced with the first homogeneous refractive index boot lens 63 because the first homogeneous refractive index boot lens 63 has a concave back surface 63b for mating with a convex front surface 82a of the bi-convex homogeneous refractive index collimating/focusing lens 82.

At this point it should be noted that, similar to the multiplexing device 60, either the first homogeneous refractive index boot lens 63 or the second homogeneous refractive index boot lens 64 may be removed from the multiplexing device 120 in order to create additional alternate embodiments (not shown) while still retaining the above-described benefits of using a high index of refraction glass material to form the bi-convex homogeneous refractive index collimating/focusing lens 82.

Figure 11:
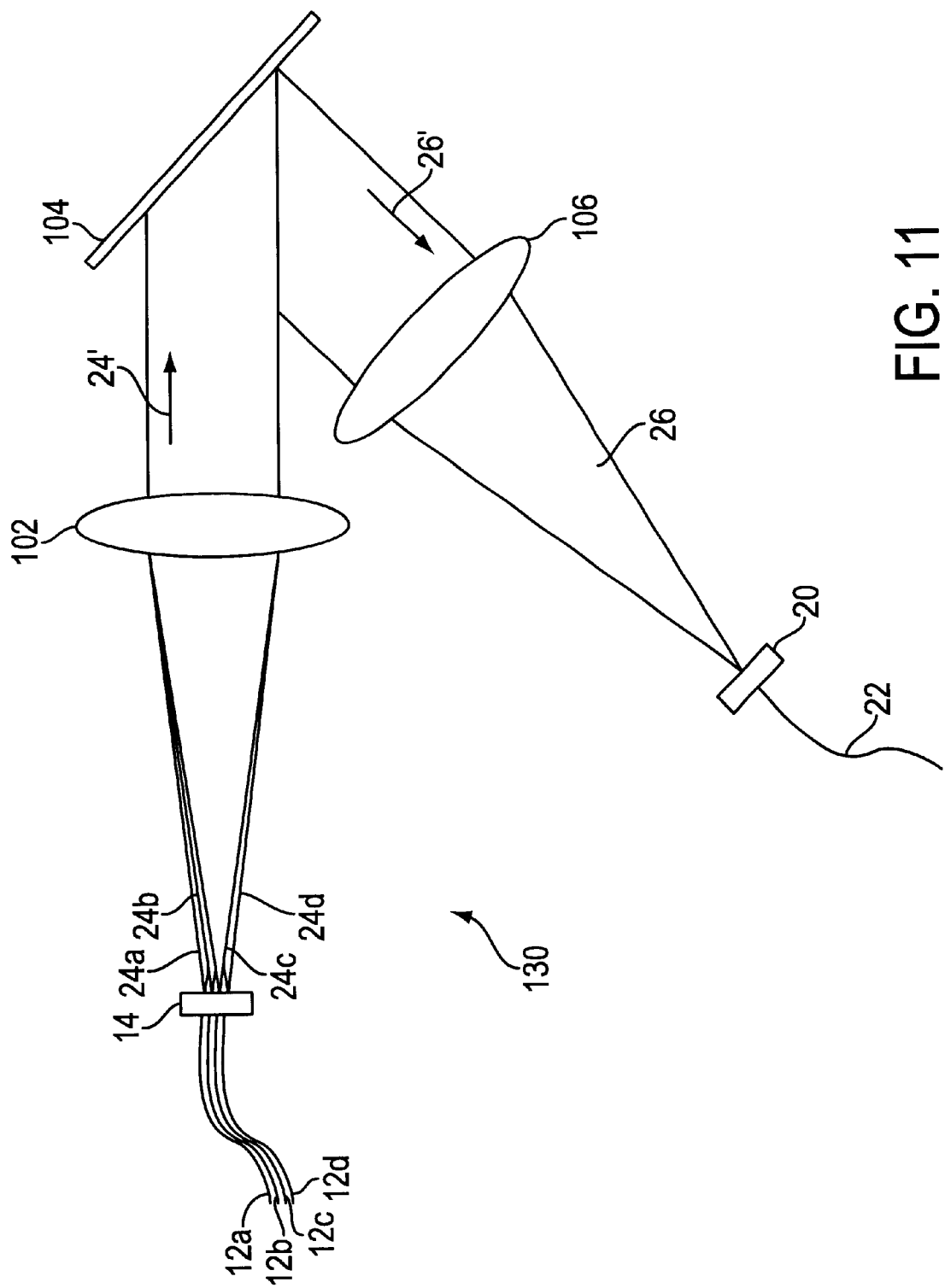
FIG. 11 is a side view of a wavelength division multiplexing device having two bi-convex homogeneous refractive index lenses and a reflective diffraction grating in accordance with the present invention.

Referring to FIG. 11, there is shown a side view of an alternate embodiment of a wavelength division multiplexing device 130 in accordance with the present invention. The multiplexing device 130 differs from the previously described embodiments by using a separate bi-convex homogeneous refractive index collimating lens 102, a separate bi-convex homogeneous refractive index focusing lens 106, and a reflective diffraction grating 104 that is configured to operate at reflecting angle that is different than the reflecting angle of the previously described embodiments. The bi-convex homogeneous refractive index collimating lens 102 collimates the plurality of monochromatic optical input beams 24, and then transmits the plurality of collimated, monochromatic optical input beams 24' to the reflective diffraction grating 104. The reflective diffraction grating 104 removes the angular separation from the plurality of collimated, monochromatic optical input beams 24' and reflects the single collimated, multiplexed, polychromatic optical output beam 26' toward the bi-convex homogeneous refractive index focusing lens 106. The bi-convex homogeneous refractive index focusing lens 106 focuses the single collimated, multiplexed, polychromatic optical output beam 26', and then transmits the resulting single multiplexed, polychromatic optical output beam 26 to the output fiber coupling device 20 where it becomes incident upon the single optical output fiber 22. The single multiplexed, polychromatic optical output beam 26 is then coupled into the single optical output fiber 22 for transmission therethrough.

In accordance with the practices described above, the bi-convex homogeneous refractive index collimating lens 102 and/or the bi-convex homogeneous refractive index focusing lens 106 in the multiplexing device 130 can be replaced with plano-convex homogeneous refractive index collimating/focusing lenses, or with homogeneous refractive index collimating/focusing doublet, triplet, or even higher number lens configurations. Also, homogeneous refractive index boot lenses can be added to the multiplexing device 130 in accordance with the practices described above. The benefits and detriments associated with using these substitute/additional components are applicable to the multiplexing device 130 as would be the case with the embodiments described above. Of course, the most significant benefits come from the use of high index of refraction glass materials for the lenses. That is, regardless of embodiment, the use of high index of refraction glass materials for lenses in WDM devices yields increased device performance, as well as reduced device cost, complexity, and manufacturing risk. Simply said, the use of high index of refraction glass lenses allows for the construction of a family of simple, low cost, yet very powerful WDM devices, particularly for use in DWDM (i.e., high channel number) applications.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. An improved wavelength division multiplexing device having a diffraction grating for combining a plurality of monochromatic optical beams into a multiplexed, polychromatic optical beam, the improvement comprising:

a homogeneous refractive index collimating/focusing lens for collimating the plurality of monochromatic optical beams traveling along a first direction to the diffraction grating, and for focusing the multiplexed, polychromatic optical beam traveling along a second direction from the diffraction grating, the second direction being substantially opposite the first direction, wherein the homogeneous refractive index collimating/focusing lens has a refractive index greater than 1.6@1550 nanometers.

2. The improved wavelength division multiplexing device as defined in claim 1, wherein the homogeneous refractive index collimating/focusing lens has a refractive index of approximately 1.9@1550 nanometers.

3. The improved wavelength division multiplexing device as defined in claim 1, wherein the homogeneous refractive index collimating/focusing lens operates in the infrared region of the electromagnetic spectrum.

4. The improved wavelength division multiplexing device as defined in claim 1, wherein the homogeneous refractive index collimating/focusing lens is a plano-convex homogeneous refractive index collimating/focusing lens.

5. The improved wavelength division multiplexing device as defined in claim 1, wherein the homogeneous refractive index collimating/focusing lens is a bi-convex homogeneous refractive index collimating/focusing lens.

6. The improved wavelength division multiplexing device as defined in claim 1, wherein the homogeneous refractive index collimating/focusing lens is a spherical homogeneous refractive index collimating/focusing lens.

7. The improved wavelength division multiplexing device as defined in claim 1, wherein the homogeneous refractive index collimating/focusing lens is an aspherical homogeneous refractive index collimating/focusing lens.

8. The improved wavelength division multiplexing device as defined in claim 1, wherein the homogeneous refractive index collimating/focusing lens is formed of a high index of refraction glass material selected from the group consisting of SF59, PBH71, LAH78, and other high index of refraction glass materials that efficiently transmit optical beams in the infrared (IR) region of the electromagnetic spectrum.

9. The improved wavelength division multiplexing device as defined in claim 1, wherein the diffraction grating is a reflective diffraction grating oriented at the Littrow diffraction angle with respect to the first and second directions.

10. An improved wavelength division multiplexing device having a diffraction grating for combining a plurality of monochromatic optical beams into a multiplexed, polychromatic optical bean, the improvement comprising:
   a homogeneous refractive index collimating lens for collimating the plurality of monochromatic optical beams traveling along a first direction to the diffraction grating; and
   a homogeneous refractive index focusing lens for focusing the multiplexed, polychromatic optical beam traveling along a second direction from the diffraction grating, the second direction being different from the first direction;
      wherein the homogeneous refractive index collimating lens is disposed apart from the homogeneous refractive index focusing lens.

11. An improved wavelength division demultiplexing device having a diffraction grating for separating a multiplexed, polychromatic optical beam into a plurality of monochromatic optical beams, the improvement comprising:
   a homogeneous refractive index collimating/focusing lens for collimating the multiplexed, polychromatic optical beam traveling along a first direction to the diffraction grating, and for focusing the plurality of monochromatic optical beams traveling-along a second direction from the diffraction grating, the second direction being substantially opposite the first direction, wherein the homogeneous refractive index collimating/focusing lens has a refractive. index greater than 1.6@1550 nanometers.

12. The improved wavelength division demultiplexing device as defined in claim 11, wherein the homogeneous refractive index collimating/focusing lens has a refractive index of approximately 1.9@1550 nanometers.

13. The improved wavelength division demultiplexing device as defined in claim 11, wherein the homogeneous refractive index collimating/focusing lens operates in the infrared region of the electromagnetic spectrum.

14. The improved wavelength division demultiplexing device as defined in claim 11, wherein the homogeneous refractive index collimating/focusing lens is a plano-convex homogeneous refractive index collimating/focusing lens.

15. The improved wavelength division emultiplexing device as defined in claim 11, wherein the homogeneous refractive index collimating/focusing lens is a bi-convex homogeneous refractive index collimating/focusing lens.

16. The improved wavelength division demultiplexing device as defined in claim 11, wherein the homogeneous refractive index collimating/focusing lens is a spherical homogeneous refractive index collimating/focusing lens.

17. The improved wavelength division demultiplexing device as defined in claim 11, wherein the homogeneous refractive index collimating/focusing lens is an aspherical homogeneous refractive index collimating/focusing lens.

18. The improved wavelength division demultiplexing device as defined in claim 11, wherein the homogeneous refractive index collimating/focusing lens is, formed of a high index of refraction glass material selected from the group consisting of SF59, PBH71, LAH78, and other high index of refraction glass materials that efficiently transmit optical beams in the infrared (IR) region of the electromagnetic spectrum.

19. The improved wavelength division demultiplexing device as defined in claim 11, wherein the diffraction grating is a reflective diffraction grating oriented at the Littrow diffraction angle with respect to the first and second directions.

20. An improved wavelength division demultiplexing device having a diffraction grating for separating a multiplexed, polychromatic optical beam into a plurality of monochromatic optical beams, the improvement comprising:
   a homogeneous refractive index collimating lens for collimating the multiplexed, polychromatic optical beam traveling along a first direction to the diffraction grating; and
   a homogeneous refractive index focusing lens for focusing the plurality of monochromatic optical beams traveling along a second direction from the diffraction grating, the second direction bring different from the first direction;
      wherein the homogeneous refractive index collimating lens is disposed apart from the homogeneous refractive index focusing lens.

21. An integrated wavelength division multiplexing device comprising:
   a homogeneous refractive index collimating/focusing lens for collimating a plurality of monochromatic optical beams traveling along a first direction, and for focusing a multiplexed, polychromatic optical beam traveling along a second direction, the second direction being substantially opposite the first direction;
   a homogeneous refractive index boot lens affixed to the homogeneous refractive index collimating/focusing lens for transmitting the plurality of monochromatic optical beams from the homogeneous refractive index collimating/focusing lens along the first direction, and for transmitting the multiplexed, polychromatic optical beam to the homogeneous refractive index collimating/focusing lens along the second direction, the homogeneous refractive index boot lens having a planar interface surface; and
   a diffraction grating formed at the planar interface surface of the homogeneous refractive index. boot lens for combining the plurality of monochromatic optical beams into the multiplexed, polychromatic optical beam, and for reflecting the multiplexed, polychromatic optical beam back into the homogeneous refractive index boot lens.

22. The device as defined in claim 21, wherein the homogeneous refractive index boot lens is incorporated into the homogeneous refractive index collimating/focusing lens such that the homogeneous refractive index collimating/focusing lens has the planar interface surface at which the diffraction grating is formed.

23. The device as defined in claim 21, wherein the homogeneous refractive index boot lens is a first homogeneous refractive index boot lens, the device further comprising:

a second homogeneous refractive index boot lens affixed to the homogeneous refractive index collimating/focusing lens for transmitting the plurality of monochromatic optical beams to the homogeneous refractive index collimating/focusing lens along the first direction, and for transmitting the multiplexed, polychromatic optical beam from the homogeneous refractive index collimating/focusing lens along the second direction.

24. The device as defined in claim 23, wherein the second homogeneous refractive index boot lens has a planar interface surface for accepting the plurality of monochromatic optical beams from at least one optical source, and for outputting the multiplexed, polychromatic optical beam to at least one optical receiver.

25. The device as defined in claim 21, wherein the homogeneous refractive index collimating/focusing lens has a planar interface surface for accepting the plurality of monochromatic optical beams from at least one optical source, and for outputting the multiplexed, polychromatic optical beam to at least one optical receiver.

26. The device as defined in claim 21, wherein the diffraction grating is a reflective diffraction grating oriented at the Littrow diffraction angle with respect to the first and second directions.

27. An integrated wavelength division demultiplexing device comprising:

a homogeneous refractive index collimating/focusing lens for collimating a multiplexed, polychromatic optical beam traveling along a first direction, and for focusing a plurality of monochromatic optical beams traveling along a second direction, the second direction being substantially opposite the first direction;

a homogeneous refractive index boot lens affixed to the homogeneous refractive index collimating/focusing lens for transmitting the multiplexed, polychromatic optical beam from the homogeneous refractive index collimating/focusing lens along the first direction, and for transmitting the plurality of monochromatic optical beams to the homogeneous refractive index collimating/focusing lens along the second direction, the homogeneous refractive index boot lens having a planar interface surface; and a diffraction grating formed at the planar interface surface of the homogeneous refractive index boot lens for separating the multiplexed, polychromatic optical beam into the plurality of monochromatic optical beams, and for reflecting the plurality of monochromatic optical beams back into the homogeneous refractive index boot lens.

28. The device as defined in claim 27, wherein the homogeneous refractive index boot lens is incorporated into the homogeneous refractive index collimating/focusing lens such that the homogeneous refractive index collimating/focusing lens has the planar interface surface at which the diffraction grating is formed.

29. The device as defined in claim 27, wherein the homogeneous refractive index boot lens is a first homogeneous refractive index boot lens, the device further comprising:

a second homogeneous refractive index boot lens affixed to the homogeneous refractive index collimating/focusing lens for transmitting the multiplexed, polychromatic optical beam to the homogeneous refractive index collimating/focusing lens along the first direction, and for transmitting the plurality of monochromatic optical beams from the homogeneous refractive index collimating/focusing lens along the second direction.

30. The device as defined in claim 29, wherein the second homogeneous refractive index boot lens has a planar interface surface for accepting the multiplexed, polychromatic optical beam from an optical source, and for outputting the plurality of monochromatic optical beams to at least one optical receiver.

31. The device as defined in claim 27, wherein the homogeneous refractive index collimating/focusing lens has a planar interface surface for accepting the multiplexed, polychromatic optical beam from an optical source, and for outputting the plurality of monochromatic optical beams to at least one optical receiver.

32. The device as defined in claim 27, wherein the diffraction grating is a reflective diffraction grating oriented at the Littrow diffraction angle with respect to the first and second directions.

33. A wavelength division multiplexing device comprising:

a homogeneous refractive index collimating lens for collimating, a plurality of monochromatic optical beams;

a diffraction grating for combining the plurality of collimated monochromatic optical beams into a multiplexed, polychromatic optical beam, and for reflecting the multiplexed, polychromatic optical beam; and a homogeneous refractive index focusing lens for focusing the reflected, multiplexed, polychromatic optical beam;

wherein the homogeneous refractive index collimating lens is disposed apart from the homogeneous refractive index focusing lens.

34. The device as defined in claim 33, further comprising:
at least one reflecting element for reflecting the plurality of collimated, monochromatic optical beams toward the diffraction grating.

35. The device as defined in claim 33, further comprising:
at least one reflecting element for reflecting the reflected, multiplexed, polychromatic optical beam toward the homogeneous refractive index focusing.

36. A wavelength division demultiplexing device comprising:

a homogeneous refractive index collimating lens for collimating a multiplexed, polychromatic optical beam;

a diffraction grating for separating the collimated, multiplexed, polychromatic optical beam into a plurality of monochromatic optical beams, and for reflecting the plurality of monochromatic optical beams; and a homogeneous refractive index focusing lens for focusing the plurality of reflected, monochromatic optical beams;

wherein the homogeneous refractive index collimating lens is disposed apart from the homogeneous refractive index focusing lens.

37. The device as defined in claim 36, further comprising:

at least one reflecting element for reflecting the collimated, multiplexed, polychromatic optical beam toward the diffraction grating.

38. The device as defined in claim 36, further comprising:

at least one reflecting element for reflecting the plurality of reflected, monochromatic optical beams toward the homogeneous refractive index focusing lens.

* * * * *